United States Patent [19]

Gersbach

[11] 3,736,574

[45] May 29, 1973

[54] PSEUDO-HIERARCHY MEMORY SYSTEM

[75] Inventor: John Edwin Gersbach, Burlington, Vt.

[73] Assignee: International Business Machines Corporation, Armonk, N.Y.

[22] Filed: Dec. 30, 1971

[21] Appl. No.: 214,199

[52] U.S. Cl. ................340/173 R, 307/238, 307/279, 340/172.5

[51] Int. Cl. ................................................G11c 11/40

[58] Field of Search .........................340/172.5, 173 R

[56] References Cited

UNITED STATES PATENTS

| | | | |
|---|---|---|---|
| 3,317,902 | 5/1967 | Michael | 340/172.5 |
| 3,599,182 | 8/1971 | Henle | 340/173 R |

*Primary Examiner*—Terrell W. Fears
*Attorney*—Martin G. Reiffin, Alvin J. Riddles and J. Jancin Jr.

[57] ABSTRACT

A monolithic memory system for a digital computer comprises an array of monolithic chips arranged in rows. Each chip includes an array of memory cells, associated support circuits, and current reference sources connected to the support circuits. Each of a plurality of power gate drivers has a line connected to the current reference sources of a respective row of chips. One power gate driver is actuated to supply power to the current reference sources of a selected row of chips which includes the selected memory cell to be addressed and the power is uninterruptedly maintained for so long as the successive cells being addressed are within the selected row of chips. When the cell being currently addressed is within a different row of chips, the original power gate driver is deactuated and a new power gate driver is actuated to supply power to the current reference sources of the new row of chips containing the memory cell to be addressed.

23 Claims, 16 Drawing Figures

Patented May 29, 1973 3,736,574

11 Sheets-Sheet 1

Patented May 29, 1973 3,736,574

11 Sheets-Sheet 5

Patented May 29, 1973 3,736,574

11 Sheets-Sheet 10

PSEUDO-HIERARCHY MEMORY SYSTEM

BACKGROUND OF THE INVENTION

1. Field of the Invention

This invention relates to memory systems for digital computers, and more particularly, to a novel pseudo-hierarchy memory system wherein the support circuits of a selected row of chips are maintained uninterruptedly powered up for so long as the successive memory cells being addressed are within said selected row of chips.

2. Description of the Prior Art

In monolithic memory systems constructed in accordance with the prior art there is provided an array of monolithic chips each having an array of memory cells each capable of storing one bit of information. Each chip also included support circuits such as decoders and data input/output circuits. The support circuits were normally maintained in an unpowered state and the support circuits of a particular chip or row of chips were powered up only when addressing a memory cell located on that particular chip or row of chips.

In the prior art memory systems, after each operation of writing into or reading out of the addressed cell, the associated support circuits were de-energized so that each reading or writing operation required that the associated support circuits first be powered up. This initial powering up of the support circuits took a substantial amount of time and thereby reduced the speed of operation of the computer. The speed of operation is one of the most important characteristics which determine the value of the computer.

SUMMARY OF THE INVENTION

It is therefore a primary object of the present invention to increase the speed of operation of a digital computer by providing an improved memory system which eliminates the time required for powering up the on-chip support circuits for those reading and writing operations which access a memory cell in the same row of chips as the previously accessed cell. Since it is relatively rare that successively addressed cells are in different rows of chips, the time required for powering up the support circuits is eliminated for all but a relatively few operations.

In the preferred embodiment of the invention illustrating one of the many forms which the invention may take, this object is achieved by the following structure: A plurality of power gate drivers are provided, one for each row of chips. Each chip has a plurality of current reference sources energizable to power up the on-chip support circuits. Each power gate driver has a power gate line connected to the current reference sources of a respective row of chips so as to power up the support circuits of the entire row while the driver is actuated. The driver is maintained uninterruptedly in an actuated state to supply power continuously to the support circuits of a selected row of chips for so long as the memory cells being successively addressed are within the same selected row.

When the next memory cell to be addressed is within a different row of chips from that of the previously addressed cell, the power gate driver associated with the row of chips containing the previously addressed cell is deactuated to power down the support circuits on said row of chips, and a new power gate driver is actuated to power up the support circuits of the new row of chips containing the next memory cell to be addressed. In this event, the cycle of operation of the computer is delayed to allow for the extra time required to power up the support circuits.

By thus eliminating the time required to power up the on-chip support circuits, the access time for each cycle of operation of the preferred embodiment is decreased from about 60 nanoseconds to about 40 nanoseconds, and the cycle time is decreased from about 100 nanoseconds to about 80 nanoseconds, as compared with a similar digital computer embodying a prior art memory system wherein the powered up support circuits are powered down after each operation. This results in a significant increase in the speed of operation and a substantial increase in the value of the computer embodying the present invention.

DESCRIPTION OF THE PREFERRED EMBODIMENT

Overall Arrangement

Figure 1:
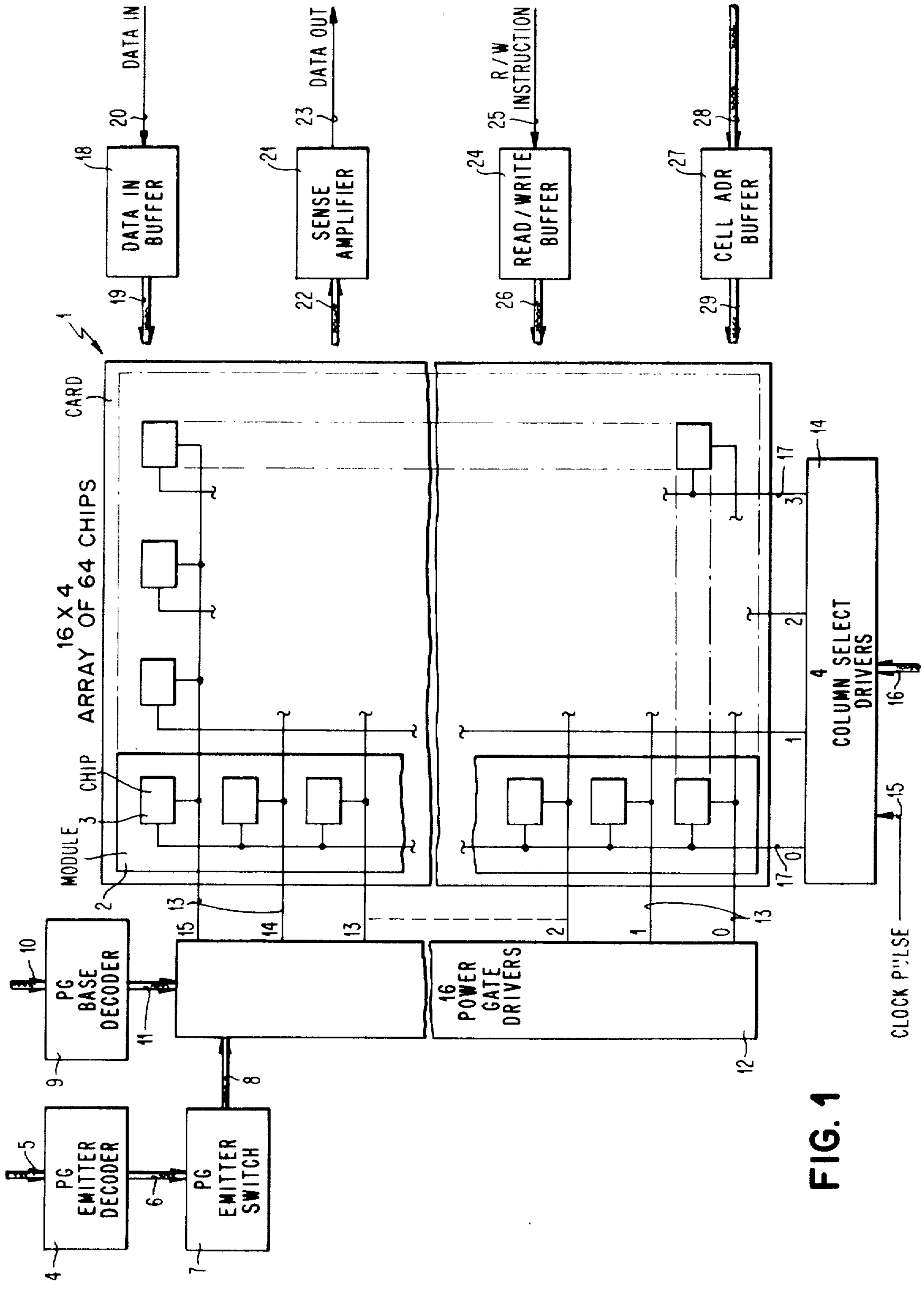
FIG. 1 is a block diagram showing the arrangement of each card of a memory system in accordance with the present invention.

The preferred embodiment of a memory system in accordance with the present invention comprises 72 cards each storing 32K bits of information to provide a total of 256K bytes for the system. The arrangement of each card is shown by the block diagram of FIG. 1. Each card comprises an array 1 of 16 modules 2 each having four chips 3 so that the array 1 comprises a total of sixty-four chips 3 arranged in 16 rows and four columns.

A power gate emitter decoder 4 is provided with two address input lines 5 and decodes the two addresses to activate one of the four output lines 6 which feed into a power gate emitter switch 7. The latter is provided with four output lines 8. There is also provided a power gate base decoder 9 having two address input lines 10 and four output lines 11. The two input addresses are decoded by decoder 9 to activate one of the four output lines 11. The output lines 8 of power gate emitter switch 7 and the output lines 11 of power gate base decoder 9 feed into a matrix of sixteen power gate drivers 12. Extending from each of the latter is a respective one of sixteen power gate lines 13.

Each of the power gate lines 13 is connected to a row of four chips 3 so that when one of the power gate lines 13 is activated, an entire row of chips 3 is powered up. A single chip 3 of the powered-up row is selected by the activation of one of four column select drivers 14 controlled by a clock pulse input 15 and two address input lines 16. Extending from each of the four column select drivers 14 is a respective one of four column select lines 17 each of which is connected to a respective column of 16 chips 3.

As will be described in detail below, each of the chips 3 comprises a monolithic array of 512 memory cells each adapted to store one bit of information. For most sequences of reading and writing operations, the memory cells are accessed in adjacent succession so that the memory cell currently addressed is in the same row of chips 3 as the cell previously addressed.

In prior art arrangements, after each operation of reading out of or writing into a memory cell, the activated power gate line 13 was deactivated so as to power down the selected row of chips 3. This required that at the beginning of each operation the selected row of chips 3 be powered up again. This technique of powering up the selected row of chips 3 for each operation required a substantial amount of access time and thereby slowed down the operation of the computer.

In the present invention, the activated power gate line 13 and the selected row of chips 3 is not powered down after each reading and writing operation, but instead are maintained uninterruptedly in a constant powered-up state for so long as the memory cells being currently addressed are within the same selected row of chips 3.

When the cell being currently addressed is not within the same row of chips 3 as the previously addressed cell, the power gate line 13 corresponding to the row of chips 3 containing the previously addressed cell is powered down and a new power gate line 13 corresponding to the new row of chips 3 containing the currently addressed cell is then powered up.

In this event, the signal into clock pulse input 15 timing the cycle of operation is delayed so as to accommodate the extra access time required to power up a new power gate line 13 and new row of chips 3. However, since this occurs relatively infrequently during the execution of a program, during most reading and writing operations the memory system in accordance with the present invention has shorter access and cycle times than achievable by prior art arrangements and thereby permits the computer to have a higher speed of operation.

Still referring to FIG. 1, each card further comprises a data in buffer 18 having output lines 19 running to all 64 chips 3 on the card and also having a data in line 20. Each card also comprises a sense amplifier 21 having inputs 22 extending from all of the 64 chips 3 on the card, and a data out line 23. Each card further comprises a read/write buffer 24 having a read/write instruction input line 25 and output lines 26 going to all 64 chips 3 on the card. The latter further comprises nine cell address buffers 27 having nine address input lines 28 and output lines 29 going to all chips 3 on the card.

Arrangement of Each Chip 3

Figure 2:
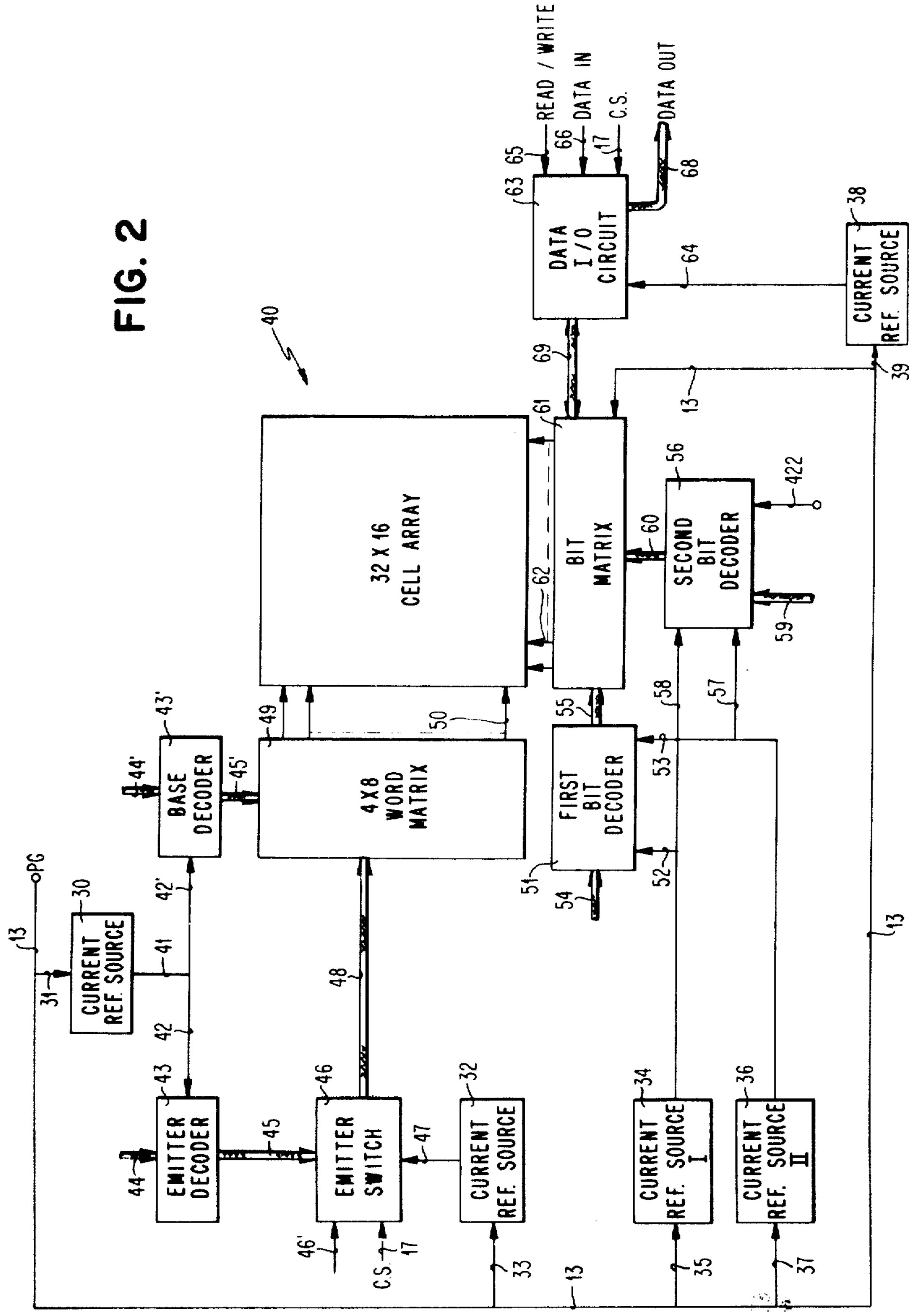
FIG. 2 is a block diagram showing the arrangement on each chip.
Figure 14:
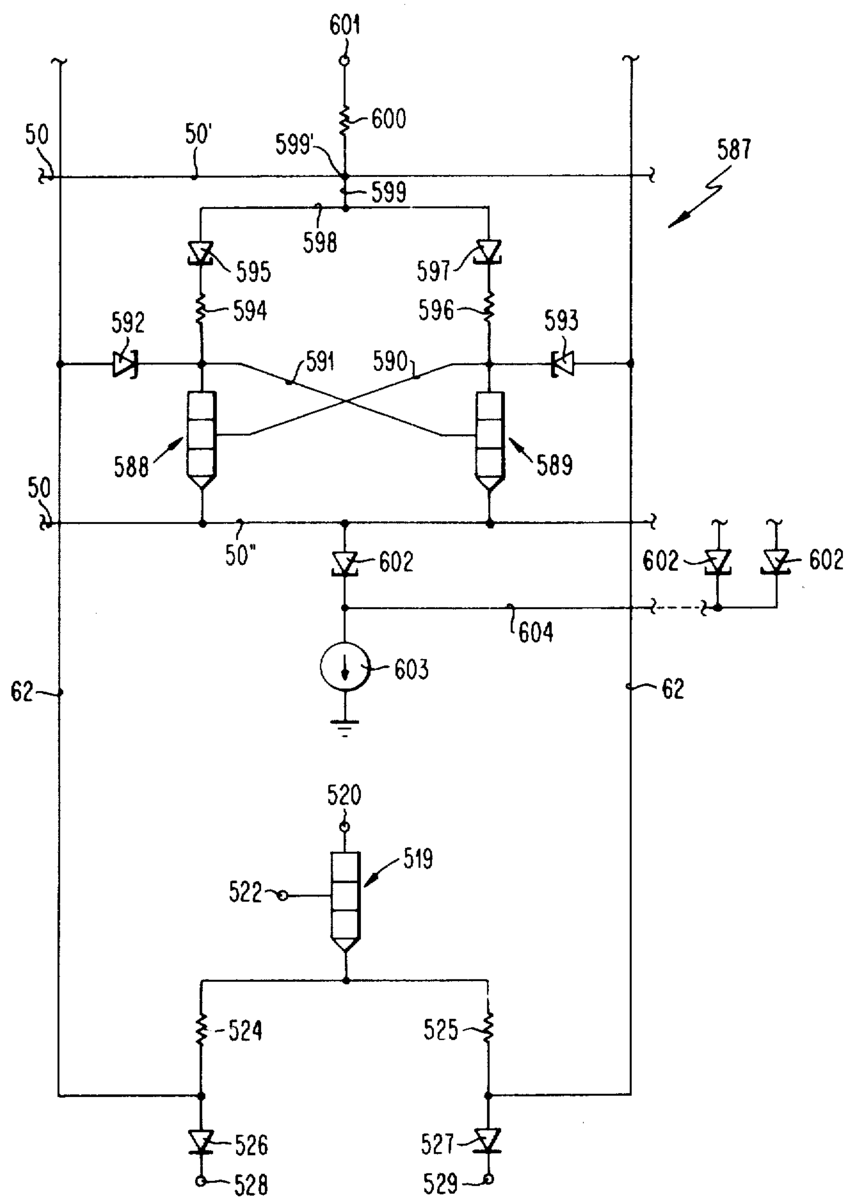
FIG. 14 is a circuit diagram showing a single memory cell and showing the connections of its bit lines to the bit matrix.
Figure 15:
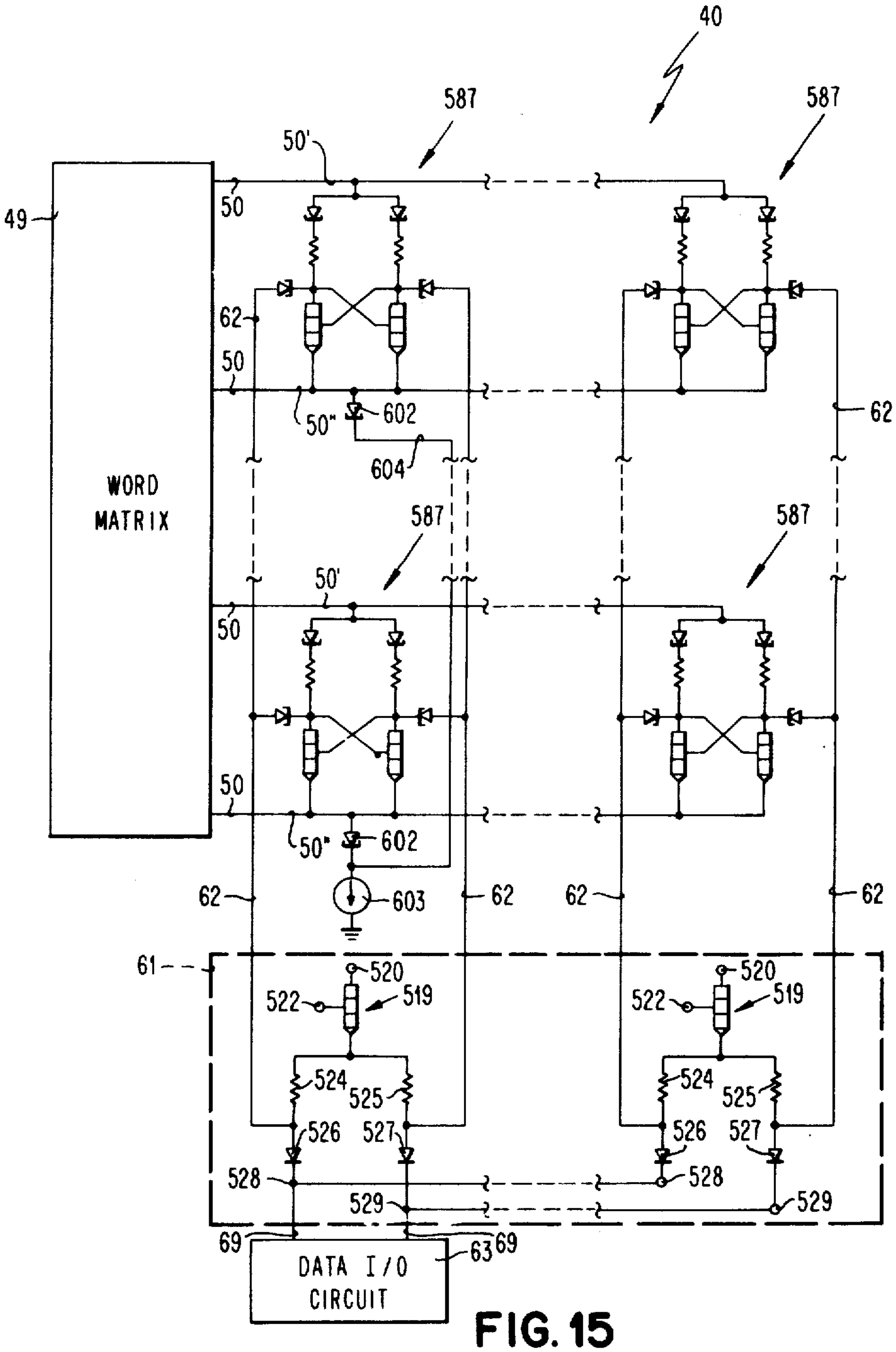
FIG. 15 is a schematic diagram showing the array of memory cells, portions of the bit matrix and connections to the data input/output circuit.

Referring now to FIG. 2, there is shown the logic arrangement on each of the monolithic chips 3. There are provided five current reference sources 30, 32, 34, 36, 38 having respective inputs 31, 33, 35, 37, 39 extending from power gate line 13. The memory cell array is indicated generally by the reference numeral 40 and comprises 512 memory cells arranged in 32 rows and 16 columns. Each of the memory cells is shown in FIG. 14 and the cell array is shown in FIG. 15, both figures being described in detail below.

An output lead 41 of current reference source 30 is connected by a lead 42 to a chip emitter decoder 43 and by a lead 42' to a chip base decoder 43'. Chip emitter decoder 43 is provided with two address input lines 44 and chip base decoder 43' is similarly provided with two address input lines 44'. Emitter decoder 43 is also provided with four output lines 45 extending to a chip emitter switch 46 having one address input line 46', a column select line 17 and an input line 47 from current reference source 32. Chip emitter switch 46 is also provided with eight output lines 48 feeding into a word matrix 49 also having four input lines 45' extending from base decoder 43'. Word matrix 49 is further provided with 32 pairs of word top and word bottom lines 50, each pair extending to a respective one of the 32 rows of memory cells constituting the array 40.

A first bit decoder 51 is provided with a line 52 extending from current reference source 34 and another line 53 extending from current reference source 36. Two address input lines 54 feed into first bit decoder 51, and extending from the latter are four output lines 55. A second bit decoder 56 is provided with two address input lines 59, an input line 57 extending from current reference source 36 and an input line 58 extending from current reference source 34.

The four output lines 60 of second bit decoder 56 and the four output lines 55 of first bit decoder 51 extend to a bit matrix 61 from which extend sixteen pairs of bit lines 62, each pair extending to all of the memory cells of a respective one of the sixteen columns comprising the array 40. A data input/output circuit 63 is provided with a line 64 extending from current reference source 38 and also with a write/read input line 65, a data in line 66, and a column select input line 17. Data input/output circuit 63 is further provided with two data out lines 68 and with two lines 69 communicating with bit matrix 61.

The overall operation of the chip circuitry shown in the block diagram of FIG. 2 will now be described. Activation of power gate line 13 causes energization of current reference sources 30, 32, 34, 36, 38 to power up the on-chip support circuits including chip emitter decoder 43, chip base decoder 43', chip emitter switch 46, first bit decoder 51, second bit decoder 56, and data input/output circuit 63. The four addresses fed into lines 44, 44' are decoded by emitter decoder 43 and base decoder 43' to activate one of the four lines 45 and one of the lines 45'. The address fed into the line 46' together with the signal on the activated line 45 are further decoded by emitter switch 46 to activate one of the eight lines 48. An element (a pair of transistors, as described in detail below) of word matrix 49 is thereby activated to select one of the 32 pairs of word bottom and word top lines 50, thereby selecting one of the thirty-two rows of memory cells of array 40.

In a similar manner, the four address signals fed into input lines 54, 59 are decoded by first bit decoder 51 and second bit decoder 56 to activate one of the four output lines 55 and one of the four output lines 60 thereby activating an element (a transistor, as described in detail below) of bit matrix 61 to activate one of the 16 pairs of bit lines 62 and thereby to select one of the 16 columns of memory cells of the array 40. The intersection of the selected row and selected column of array 40 determines the single memory cell to be currently addressed, and one bit of information may be read out of or written into the single selected cell by the data input/output circuit 63 in a manner to be described in detail below.

Power Gate Emitter Decoder 4

Figure 3:
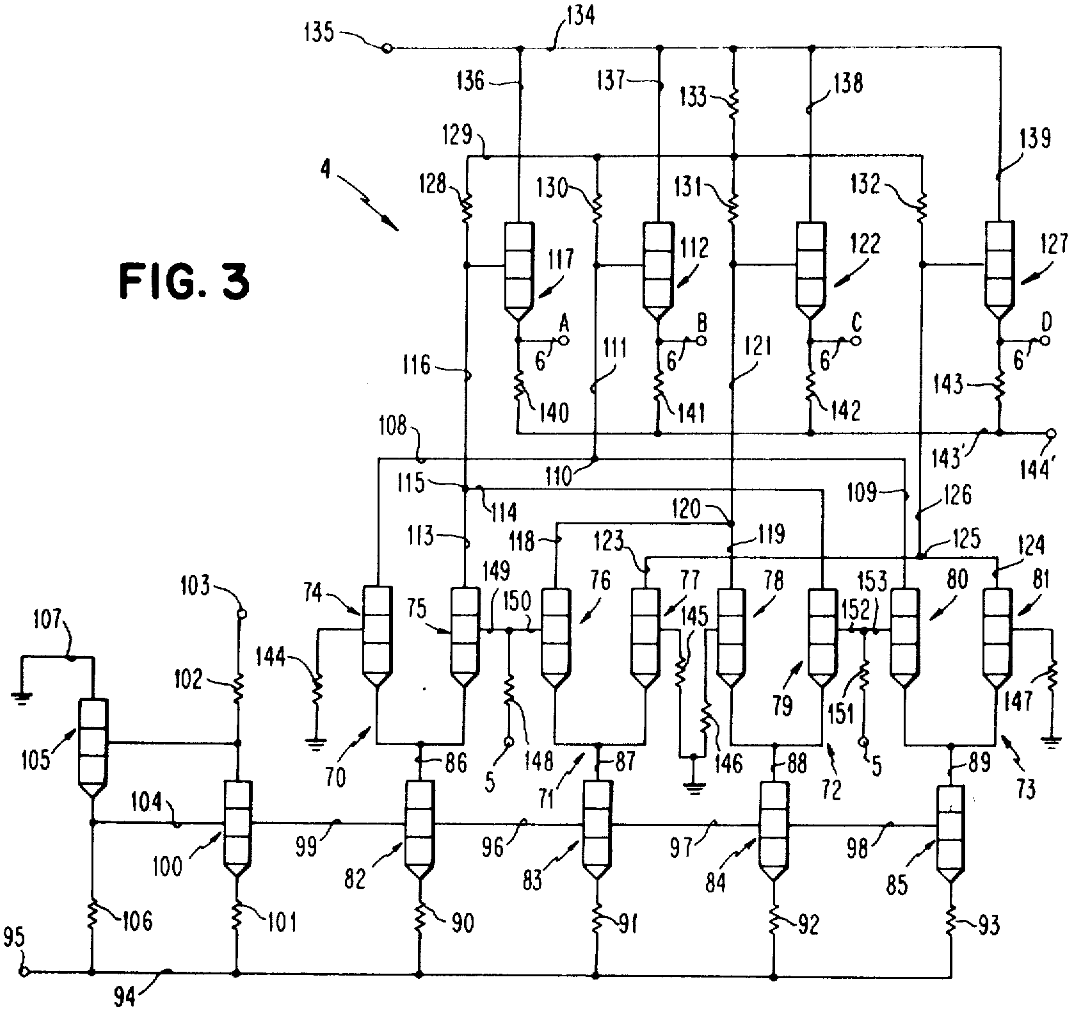
FIG. 3 is a circuit diagram of the power gate emitter decoder.

Referring now to FIG. 3, there is disclosed the circuitry of power gate emitter decoder 4. The reference numerals 70, 71, 72, 73 indicate generally four current switches each comprising a pair of transistors 74, 75, 76, 77, 78, 79, 80, 81. Each current switch is provided with a current sink in the form of a respective one of the transistors 82, 83, 84, 85 connected to the emitters of the current switch transistors by a respective one of the lines 86, 87, 88, 89 each extending from a collector of one of the current sink transistors 82, 83, 84, 85.

Extending from the emitters of the latter are resistors 90, 91, 92, 93 having their lower ends connected to a lead 94 in turn connected to a voltage supply 95. The bases of current sink transistors 82, 83, 84, 85 are interconnected by leads 96, 97, 98 and the base of transistor 82 is connected by lead 99 to the base of a transistor 100 having its emitter connected by a resistor 101 to lead 94 and its collector connected by a resistor 102 to a voltage supply 103. The base of transistor 100 is connected by a lead 104 to the emitter of a transistor 105 and also to the upper end of a resistor 106 having its lower end connected to lead 94. The collector of transistor 105 is connected by lead 107 to ground.

Leads 108, 109 extend from the respective collectors of current switch transistors 74, 80 to a node 110 connected by a lead 111 to the base of a transistor 112. The collectors of current switch transistors 75, 79 are connected by leads 113, 114 to a node 115 connected by lead 116 to the base of a transistor 117. The collectors of current switch transistors 76, 78 are connected by leads 118, 119 to a node 120 connected by lead 121 to the base of a transistor 122. The collectors of transistors 77, 81 are connected by leads 123, 124 to a node 125 connected by lead 126 to the base of a transistor 127.

A resistor 128 extends from the base of transistor 117 to a lead 129. A resistor 130 extends from the base of transistor 112 to lead 129. A resistor 131 extends from the base of transistor 122 to lead 129. A resistor 132 extends from the base of transistor 127 to lead 129. The latter is connected by a resistor 133 to a lead 134 in turn connected to a voltage supply 135. The collectors of transistors 112, 117, 122, 127 are connected by leads 136, 137, 138, 139 to lead 134 and voltage supply 135.

The emitters of transistors 112, 117, 122, 127 are connected by resistors 140, 141, 142, 143 to a lead 143' connected to a voltage supply 144'. The bases of current switch transistors 74, 77, 78, 81 are connected to ground through resistors 144, 145, 146, 147. One of the address input lines 5 is connected through resistor 148 and leads 149, 150 to the bases of current switch transistors 75, 76, and the other address input line 5 is connected through resistor 151 and leads 152, 153 to the respective bases of current switch transistors 79, 80.

The operation of the circuitry of power gate emitter decoder 4 shown in FIG. 3 is as follows. The signal at the left-hand address input line 5 determines which of the transistors of the current switches 70, 71 is conductive, and the signal at the right-hand address input line 5 determines which of the transistors of the current switches 72, 73 is conductive. The collectors of the conducting transistors swing downwardly in potential due to the voltage drop across those load resistors 128, 130, 131, 132 through which collector current flows. As a result, three of the four nodes 110, 115, 120, 125 swing downwardly in potential so as to reduce conduction through three of the four transistors 112, 117, 122, 127. However, one of the nodes 110, 115, 120, 125 will remain at an upper potential level so that one of the resistors 128, 130, 131, 132 will bias upwardly the base of one of the transistors 112, 117, 122, 127 so that one transistor will conduct more than the other three transistors. As a result, a selected one of the four output lines 6 extending from the respective emitters of transistors 112, 117, 122, 127 will be at a raised potential level.

Transistors 100, 105 provide a regulated voltage at the bases of transistors 82, 83, 84, 85. For example, assume that the voltage on lines 96, 97, 98, 99 tends to rise. This causes more collector current to flow through transistor 100 thereby increasing the voltage drop across resistor 102 and lowering the voltage at the collector of transistor 100 and therefore at the base of transistor 105. The emitter of transistor 105 thereby swings downwardly in potential as it follows the potential swing of the base, thus lowering the potential on line 104 so as to counteract the tendency of the potential on lines 96, 97, 98, 99 to rise.

Power Gate Emitter Switch 7

Figure 4:
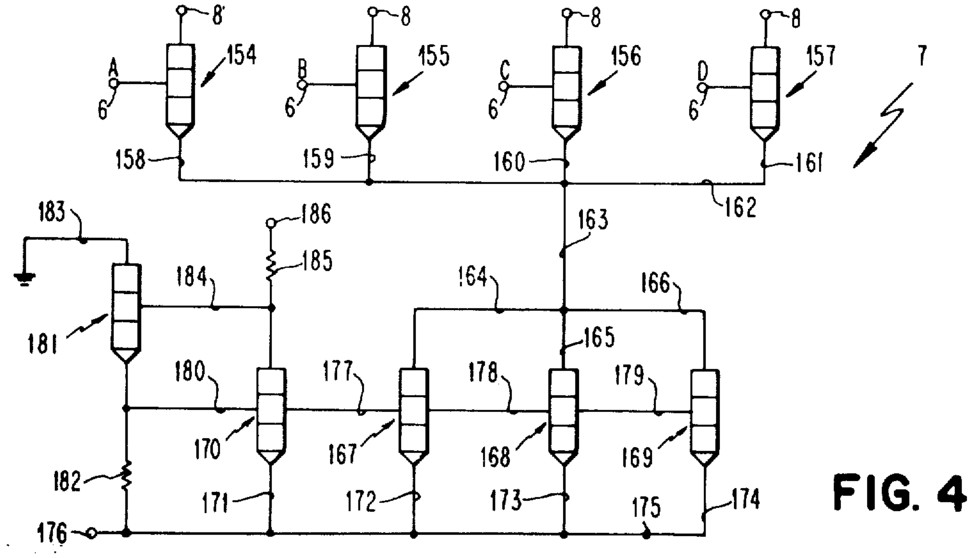
FIG. 4 is a circuit diagram of the power gate emitter switch.

Referring now to FIG. 4, there is shown the circuitry of power gate emitter switch 7. The four lines 6 extending from power gate emitter decoder 4 are connected to the respective bases of transistors 154, 155, 156, 157. The emitters of these transistors are connected by lines 158, 159, 160, 161 to a line 162 in turn connected to a line 163 connected to the lines 164, 165, 166. Each of the latter is connected to a collector of a respective one of transistors 167, 168, 169 which function as a current sink. The emitters of these transistors are connected by leads 171, 172, 173, 174 to a lead 175 in turn connected to a voltage supply 176.

The bases of transistors 167, 168, 169 are connected by leads 177, 178, 179, 180 to the emitter of a transistor 181. Extending from this emitter is a resistor 182 having its lower end connected to lead 175. The collector of transistor 181 is connected to ground by lead 183. The base of transistor 181 is connected by lead 184 to the collector of transistor 170 which is also connected to the lower end of a resistor 185 having its upper end connected to a voltage supply 186.

The operation of the circuitry of power gate emitter switch 7 shown in FIG. 4 is as follows. Transistors 170, 181 provide a regulated voltage supply for the bases of transistors 167, 168, 169 and operate in the same manner as described above with respect to transistors 100, 105 of FIG. 3. Also described with respect to FIG. 3 was the fact that one of the lines 6 is at raised potential due to the decoding function of power gate emitter decoder 4. As a result, only one of the transistors 154, 155, 156, 157 of FIG. 4 is turned on so as to activate one of the four output lines 8 connected to the respective collectors of these transistors.

Power Gate Base Decoder 9

Figure 5:
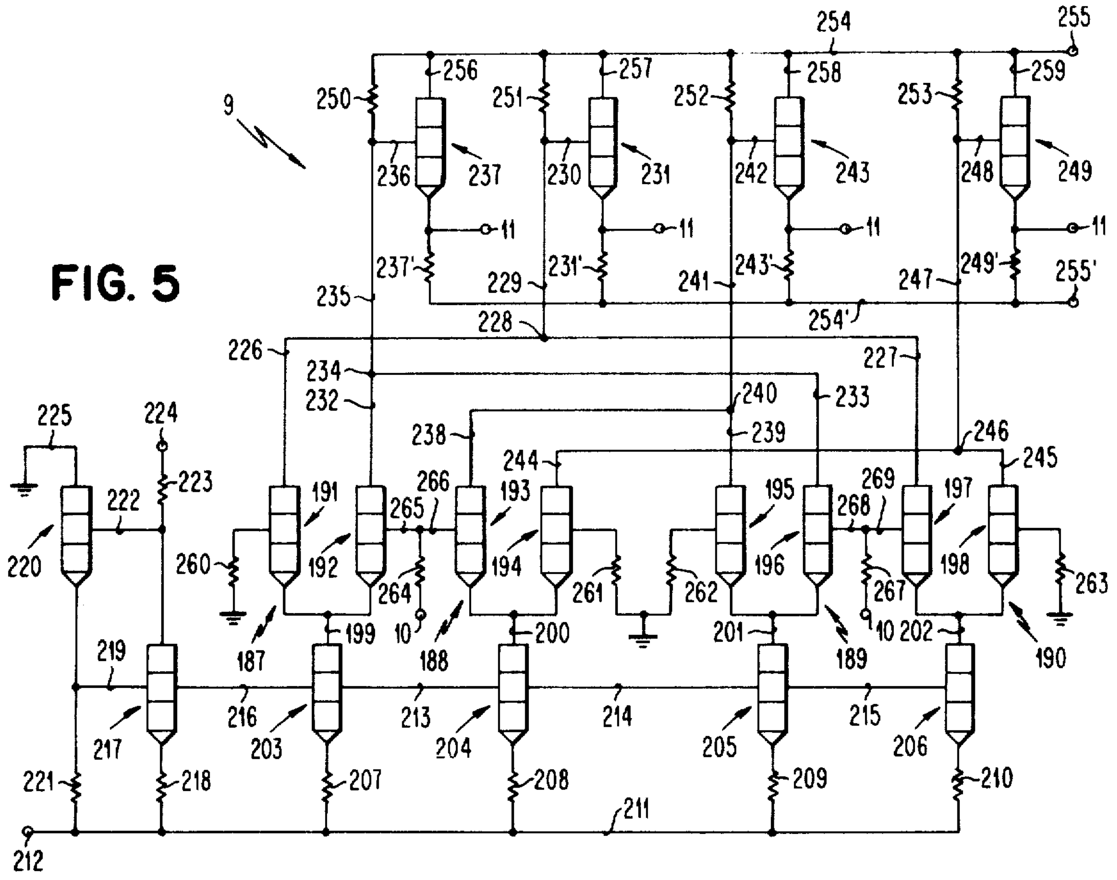
FIG. 5 is a circuit diagram of the power gate base decoder.

Referring now to FIG. 5, there is shown the circuitry of power gate base decoder 9. The reference numerals 187, 188, 189, 190 indicate generally four current switches comprising transistors 191, 192, 193, 194, 195, 196, 197, 198. The emitters of each pair of transistors are connected by leads 199, 200, 201, 202 to the respective collectors of transistors 203, 204, 205, 206 having their respective emitters connected by resistors 207, 208, 209, 210 to a lead 211 in turn connected to a voltage supply 212.

The bases of transistors 203, 204, 205, 206 are interconnected by leads 213, 214, 215 and are connected by lead 216 to the base of a transistor 217 having its emitter connected by a resistor 218 to lead 211. The base of transistor 217 is connected by a lead 219 to the emitter of a transistor 220, which emitter is also connected by a resistor 221 to lead 211. The collector of transistor 217 is connected by a lead 222 to the base of transistor 220 and is also connected by a resistor 223 to a voltage supply 224. The collector of transistor 220 is connected to ground by a lead 225.

The collectors of transistors 191, 197 are connected by leads 226, 227 to a node 228 connected by leads 229, 230 to the base of a transistor 231. The collectors of transistors 192, 196 are connected by leads 232, 233 to a node 234 connected by leads 235, 236 to the base of a transistor 237. The collectors of transistors 193, 195 are connected by leads 238, 239 to a node 240 connected by leads 241, 242 to the base of a transistor 243. The collectors of transistors 194, 198 are connected by leads 244, 245 to a node 246 connected by leads 247, 248 to the base of a transistor 249.

The bases of transistors 231, 237, 243, 249 are connected by resistors 250, 251, 252, 253 to a lead 254 in turn connected to a voltage supply 255. The collectors of transistors 231, 237, 243, 249 are connected by leads 256, 257, 258, 259 to a lead 254 and a voltage supply 255. The bases of transistors 191, 194, 195, 198 are connected to ground through resistors 260, 261, 262, 263. The left-hand address input line 10 is connected by a resistor 264 and leads 265, 266 to the bases of transistors 192, 193. The right-hand address input line 10 is connected by a resistor 267 and leads 268, 269 to the bases of transistors 196, 197.

The emitters of transistors 231, 237, 243, 249 are connected by resistors 231′, 237′, 243′, 249′ to the line 254′ in turn connected to a voltage supply 255′.

The operation of the circuitry of power gate base decoder 9 shown in FIG. 5 is as follows. Transistors 217, 220 provide a regulated voltage supply for the bases of transistors 203, 204, 205, 206 in the same manner as described above with respect to transistors 100, 105 of FIG. 3. Transistors 203, 204, 205, 206 thus serve as constant current sink for the respective current switches 187, 188, 189, 190. The signals at address input lines 10 determine which of transistors 191, 192, 193, 194, 195, 196, 197, 198 are rendered conductive, whereby collector current will flow through three of the four collector load resistors 250, 251, 252, 253. As a result, the signals at the address input lines 10 will be decoded to provide a raised potential level at one of the four bases of transistors 231, 237, 243, 249, thereby providing an up level at only one of the four output lines 11.

Power Gate Driver 12

Figure 6:
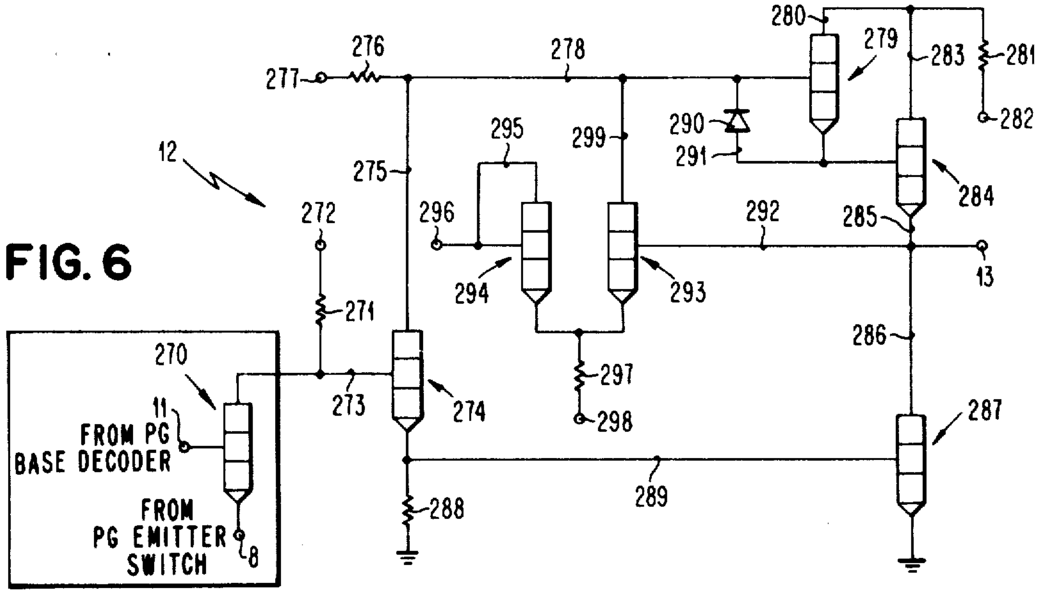
FIG. 6 is a circuit diagram of one of the sixteen power gate drivers.

Referring now to FIG. 6, there is shown the circuitry of one of the sixteen power gate drivers 12. Each of the output lines 11 of power gate base decoder 9 is connected to a base of a respective transistor 270 and each of the output lines 8 of power gate emitter switch 7 is connected to an emitter of said transistor 270. The collector of each transistor 270 is connected by a load resistor 271 to a voltage supply 272 and is connected by a lead 273 to the base of a transistor 274 having its collector 275 connected through a load resistor 276 to a voltage supply 277.

The collector of transistor 274 is connected by a lead 278 to the base of a transistor 279 having its collector connected by a lead 280 to the lower end of a load resistor 281 having its upper end connected to a voltage supply 282. The lower end of resistor 281 is connected by a lead 283 to the collector of a transistor 284 having its emitter connected by a lead 285 to the respective power gate line 13 first described with respect to FIG. 1. The line 13 is connected by a lead 286 to the collector of a transistor 287 having its emitter connected to ground. The emitter of transistor 274 is connected to ground by a resistor 288 and is connected by a lead 289 to the base of transistor 287. A diode 290 has its anode connected by a lead 291 to the emitter of transistor 279 and its cathode connected to the base of transistor 279.

Each power gate line 13 is connected by a lead 292 to the base of a transistor 293 having its emitter connected to the emitter of another transistor 294. The latter functions as a diode and has its collector connected to its base by a lead 295. The base and collector of transistor 294 are connected to a voltage supply 296. The emitters of transistors 293, 294 are connected by a resistor 297 to a voltage supply 298. The collector of transistor 293 is connected by a lead 299 to lead 278 and hence to the base of transistor 279.

The operation of the circuitry associated with each power gate driver 12 shown in FIG. 6 is as follows. One of the sixteen power gate drivers 12 is selected and powered up if the signal on its respective output line 11 from power gate base decoder 9 is at an up level and the signal at the respective output line 8 from power gate emitter switch 7 is at a down level so as to turn on transistor 270. Conduction of transistor 270 causes collector current to flow through load resistor 271 thereby lowering the potential at the base of transistor 274 cutting off the latter. This causes the potential at the collector of transistor 274 and at the base of transistor 279 to rise, thereby turning on transistor 279.

The latter acts as an emitter follower so as to cause a rise in potential at the base of transistor 284 which also acts as an emitter follower to cause a rise in potential of power gate line 13, thereby powering up the latter. This action is aided by the fact that when transistor 274 turns off, the potential at its emitter is permitted to drop to ground level, thereby turning off transistor 287.

Diode 290 pulls down the base of transistor 284 during the down swing of power gate line 13. Transistors 293, 294 provide feedback to limit the upward swing of power gate line 13.

Current Reference Sources 30, 32, 34, 38

Figure 7:
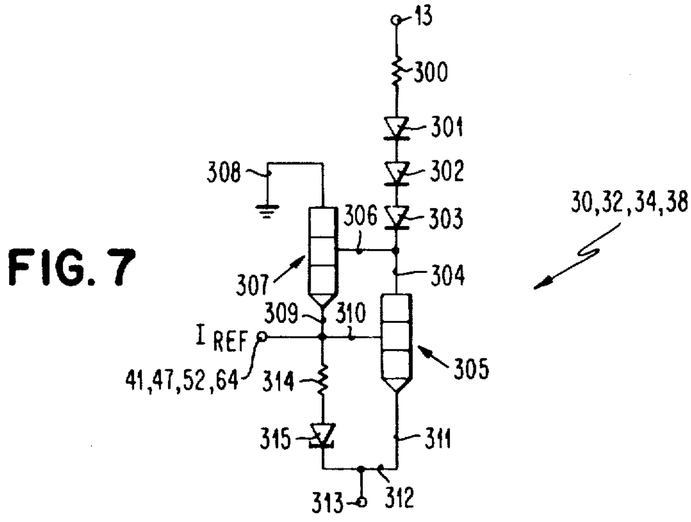
FIG. 7 is a circuit diagram of one of the current reference sources.

Referring now to FIG. 7, there is disclosed the circuitry for each of the four current reference sources 30, 32, 34, 38. Current reference source 36 is shown in and described with reference to FIG. 11. Each of the current reference sources 30, 32, 34, 38 is provided with a resistor 300 and three diodes 301, 302, 303 in series with the respective power gate line 13. A lead 304 connects the lowermost diode 303 to the collector of a transistor 305, which collector is also connected by a lead 306 to the base of a transistor 307 having its collector connected to ground by a lead 308. The emitter of transistor 307 is connected by leads 309, 310 to the base of transistor 305. The emitter of the latter is connected by leads 311, 312 to a voltage supply 313.

A resistor 314 and diode 315 extend in series from lead 310 to voltage supply 313. The output line of the current reference source is designated 41, 47, 52, 64 in accordance with the reference numerals applied in FIG. 2. It will be seen that current reference sources 30, 32, 34, 38 are energized to power up the respective on-chip support circuits only when the potential of power gate line 13 is at an upper or activated level.

Chip Emitter and Chip Base Decoders 43, 43'

Figure 8:
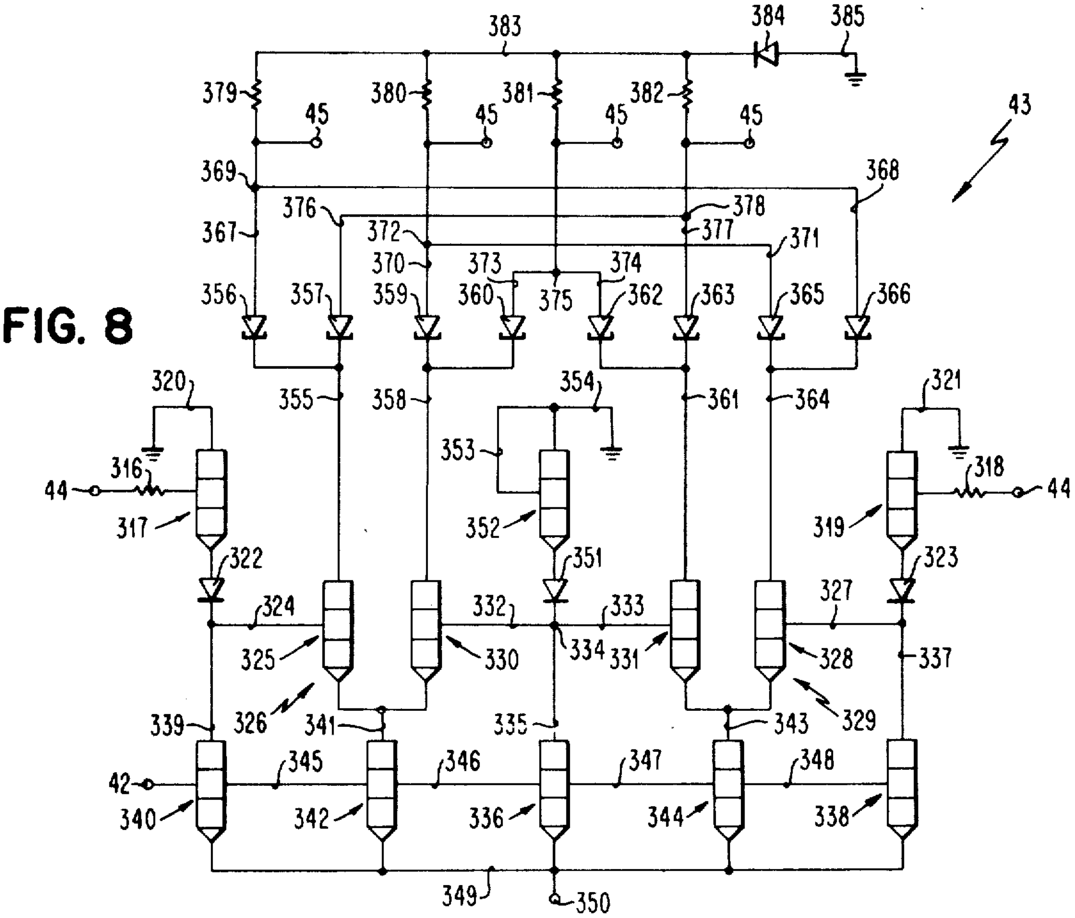
FIG. 8 is a circuit diagram of the chip emitter decoder, which circuitry is substantially similar to that of the chip base decoder.

Referring now to FIG. 8, there is shown the circuitry of chip emitter decoder 43. The circuitry of chip base decoder 43' is identical thereto except for the omission of diode 384 and its replacement by a shunt directly to ground through lead 385. The left-hand address input line 44 is connected through resistor 316 to the base of a transistor 317, and the right-hand address input line 44 is connected through a resistor 318 to the base of a transistor 319. The collectors of transistors 317, 319 are connected to ground through leads 320, 321, respectively. Their emitters are connected by diodes 322, 323 and leads 324, 327 to the bases of transistors 325, 328 of a pair of current switches indicated generally by the reference numerals 326, 329.

Current switch 326 also comprises a transistor 330 and current switch 329 also comprises a transistor 331. The bases of transistors 330, 331 are connected by leads 332, 333 to a node 334 connected by a lead 335 to the collector of a transistor 336. The lower end of diode 323 is connected by a lead 337 to the collector of a transistor 338, and the lower end of diode 322 is connected by a lead 339 to the collector of a transistor 340. The emitters of transistors 325, 330 are connected by a lead 341 to the collector of a transistor 342, and the emitters of transistors 328, 331 are connected by a lead 343 to the collector of a transistor 344.

The bases of transistors 340, 342, 336, 344, 338 are interconnected by leads 345, 346, 347, 348. These bases are also connected to the line 42 extending from current reference source 30 (FIG. 2). The emitters of transistors 336, 342, 344, 340, 338 are connected to a lead 349 in turn connected to a voltage supply 350. A diode 351 has its cathode connected to node 334 and its anode connected to the emitter of a transistor 352. The latter functions as a diode and has its collector connected to its base by a lead 353 and connected to ground by a lead 354.

The collector of transistor 325 is connected by a lead 355 to the cathodes of diodes 356, 357. The collector of transistor 330 is connected by a lead 358 to the cathodes of diodes 359, 360. The collector of transistor 331 is connected by a lead 361 to the cathodes of diodes 362, 363. The collector of transistor 328 is connected by a lead 364 to the cathodes of diodes 365, 366. The anodes of diodes 356, 366 are connected by leads 367, 368 to a node 369. The anodes of diodes 359, 365 are connected by leads 370, 371 to a node 372. The anodes of diodes 360, 362 are connected by leads 373, 374 to a node 375. The anodes of diodes 357, 363 are connected by leads 376, 377 to a node 378.

Nodes 369, 372, 375, 378 are connected to the lower ends of respective resistors 379, 380, 381, 382 having their upper ends connected to a lead 383 connected to the cathode of a diode 384 having its anode connected to ground by a lead 385. As noted above, in the circuitry of base decoder 43' the diode 384 is omitted and instead lead 385 extends directly to lead 383. The four output lines 45 extend from the respective lower ends of resistors 379, 380, 381, 382.

The operation of the circuitry of chip emitter and base decoders 43, 43' shown in FIG. 8 will now be described. The signals at the address input lines 44 will be transmitted through transistors 317, 319 and diodes 322, 323 to the bases of transistors 325, 328 so as to determine which of the transistors 325, 328, 330, 331 are rendered conductive. Two out of four of these transistors will conduct so that collector current flows through three of the four load resistors 379, 380, 381, 382. Therefore, three of the four output lines 45 will be at a down level and one of these output lines 45 will be at an up level so as to be selected.

Transistors 342, 344 serve as current sinks for the current switches 326, 329.

Transistor 336, together with diode 351 and transistor 352 provide a bias supply for the bases of transistors 330, 331. It will be seen that transistors 336, 338, 340, 342, 344 will be in the active state only when the input line 42 from current reference source 30 is at an activated or up level.

Chip Emitter Switch 46

Figure 9:
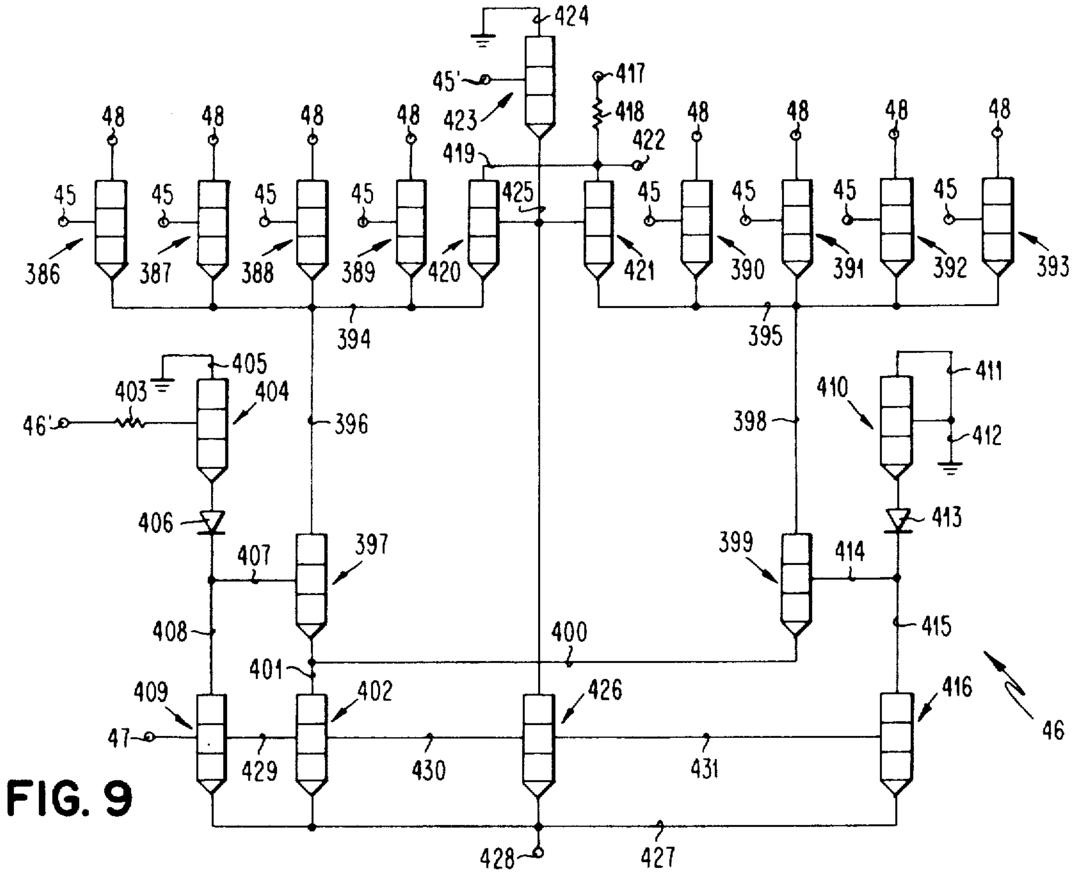
FIG. 9 is a circuit diagram of the chip emitter switch.

Referring now to FIG. 9, there is shown the circuitry for chip emitter switch 46. The four output lines 45 from chip emitter decoder 43 (FIG. 2) are connected to the respective bases of transistors 386, 387, 388, 389 and also to the respective bases of transistors 390, 391, 392, 393 so that each of the four output lines 45 is connected to the bases of two transistors. The emitters of transistors 386, 387, 388, 389 are connected to a lead 394 and the emitters of transistors 390, 391, 392, 393 are connected to a lead 395. Lead 394 is connected by a lead 396 to the collector of a transistor 397, and lead 395 is connected by a lead 398 to the collector of a transistor 399. Transistors 397, 399 cooperate to form a current switch and have their emitters connected by a lead 400 in turn connected by a lead 401 to the collector of a transistor 402.

The address input line 46' is connected by a resistor 403 to the base of a transistor 404 having its collector connected to ground by a lead 405. The emitter of transistor 404 is connected to the anode of a diode 406 having its cathode connected by a lead 407 to the base of transistor 397. The cathode of diode 406 is also connected by a lead 408 to the collector of a transistor 409. A transistor 410 is connected as a diode in that its collector is connected by a lead 411 to its base. The collector and base of transistor 410 are also connected to ground through a lead 412. The emitter of transistor 410 is connected to the anode of a diode 413 having its cathode connected by a lead 414 to the base of transistor 399. The cathode of diode 413 is also connected by a lead 415 to the collector of a transistor 416.

At the top of FIG. 9 there is shown a voltage supply 417 connected to the upper end of a resistor 418 having its lower end connected by a lead 419 to the collectors of transistors 420, 421. The emitters of the latter are connected to leads 394, 395, respectively. Extending from the lower end of resistor 418 is an output line 422 which extends to bit matrix 61, as will be described in detail below.

The column select input line 45' is connected to the base of a transistor 423 having its collector connected to ground by a lead 424 and its emitter connected by a lead 425 to the bases of transistors 420, 421 and to the collector of transistor 426. The emitters of transistors 402, 409, 416, 426 are connected to a lead 427 in turn connected to a voltage supply 428. The bases of transistors 402, 409, 416, 426 are interconnected by leads 429, 430, 431 and are also connected to the output line 47 of current reference source 32 (FIG. 2).

The operation of the circuitry of emitter switch 46 shown in FIG. 9 will now be described. When current reference source 32 (FIG. 2) is powered up by activation of a respective power gate line 13, line 47 is at an up level to activate current sink transistor 402 (FIG. 9). The collector current in transistor 402 may flow through either transistor 397 or transistor 399 since these transistors cooperate to function as a current switch. If transistor 397 is conductive, then current may flow through one of the transistors 386, 387, 388, 389. However, it transistor 399 is conductive, then current may flow through one of the transistors 390, 391, 392, 393.

This flow of current is dependent upon the signal at address input line 46'. In the event that this line is at an up level, the base of transistor 397 is pulled upwardly to a higher potential than the base reference potential of transistor 399 and transistor 397 conducts while transistor 399 is cut off. If the potential at address input line 46' is at a down level, then the potential at the base of transistor 397 is lower than the base reference potential of transistor 399 and in this event, transistor 399 conducts while transistor 397 is cut off.

Since a selected one of the four lines 45 extending to the bases of transistors 386, 387, 388, 389 and also the same selected line 45 extending to one of the bases of transistors 390, 391, 392, 393 is at an up level, it will be seen that the lines 45 select one transistor from each group of four transistors. However, only one of the two selected transistors will be rendered conductive, depending upon whether the signal at address input line 46' is at an up level. Therefore, only one of the eight output lines 48 at the collectors of transistors 386, 387, 388, 389, 390, 391, 392, 393 will be activated; that is, lowered in potential by the conductive state of the respective transistor.

This selection operation will occur only when the potential at column select line 17 of transistor 423 is at a down level. When line 17 is at an up level, the potential of the emitter of transistor 423 is raised to raise the potential of the bases of transistors 420, 421 so that transistor 420 will rob the current from transistors 386, 387, 388, 389 and transistor 421 will rob the current from transistors 390, 391, 392, 393. Furthermore, when transistors 420, 421 are rendered conductive, collector current flows through resistor 418 to lower the potential at output line 422 extending to the bit matrix 61. As will be described in detail below, the potential of line 422 must be at an up level to enable operation of bit matrix 61.

Word Matrix 49

Figure 10:
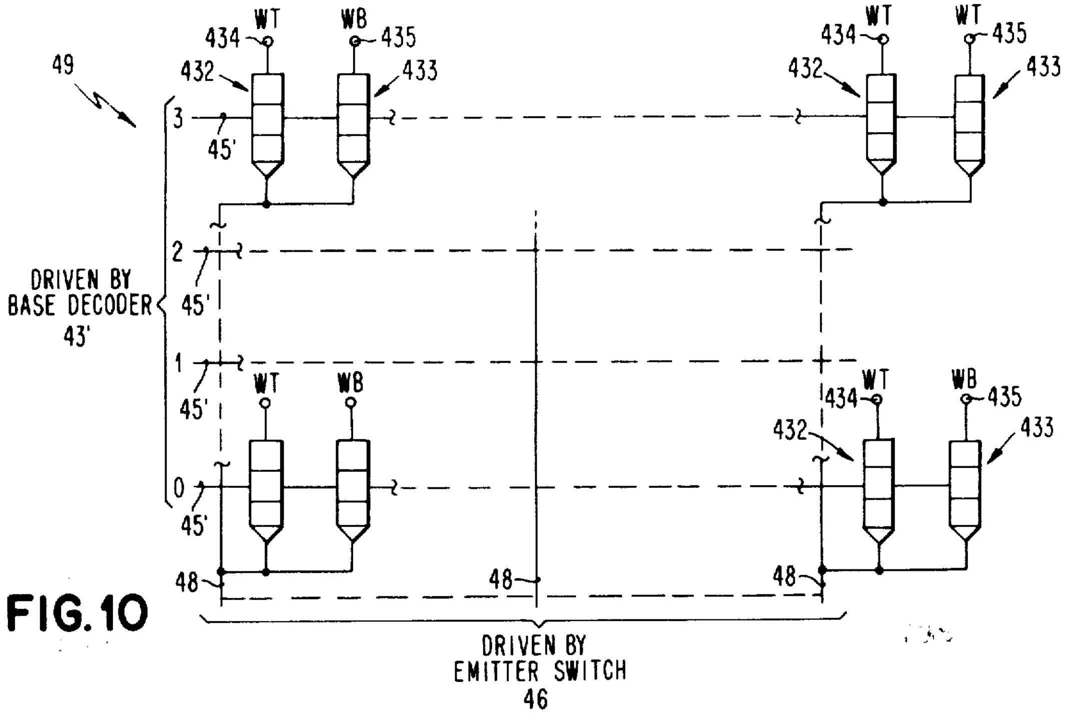
FIG. 10 is a schematic diagram of the word matrix.

Referring now to FIG. 10, there is shown a schematic diagram of word matrix 49. Each element of the matrix comprises a pair of transistors 432, 433. The collector of each transistor 432 is connected at 434 to a respective word top line (50' in FIG. 14), and the collector of each transistor 433 is connected at 435 to a respective word bottom line (50'' in FIG. 14).

Word matrix 49 comprises four rows and eight columns of transistor pairs 432, 433. A respective one of the four output lines 45' from base decoder 43' is connected to the bases of transistors 432, 433 of each row. A row of transistors 432, 433 is selected when the respective line 45' is at an up level.

Each of the lines 48 extending from emitter switch 46 is connected to the emitters of transistors 432, 433 of a respective one of the eight columns. A column is selected when the respective line 48 is at a down level. It will thus be seen that the coincidence of a single row and single column will cause the base-emitter junctions of a single pair of transistors 432, 433 to be forward biased so as to lower the potential of a single pair of word top and word bottom lines 50', 50'' and thereby select a row of memory cells of array 40, as will be described in detail below.

Bit Decoders 51, 56

Figure 11:
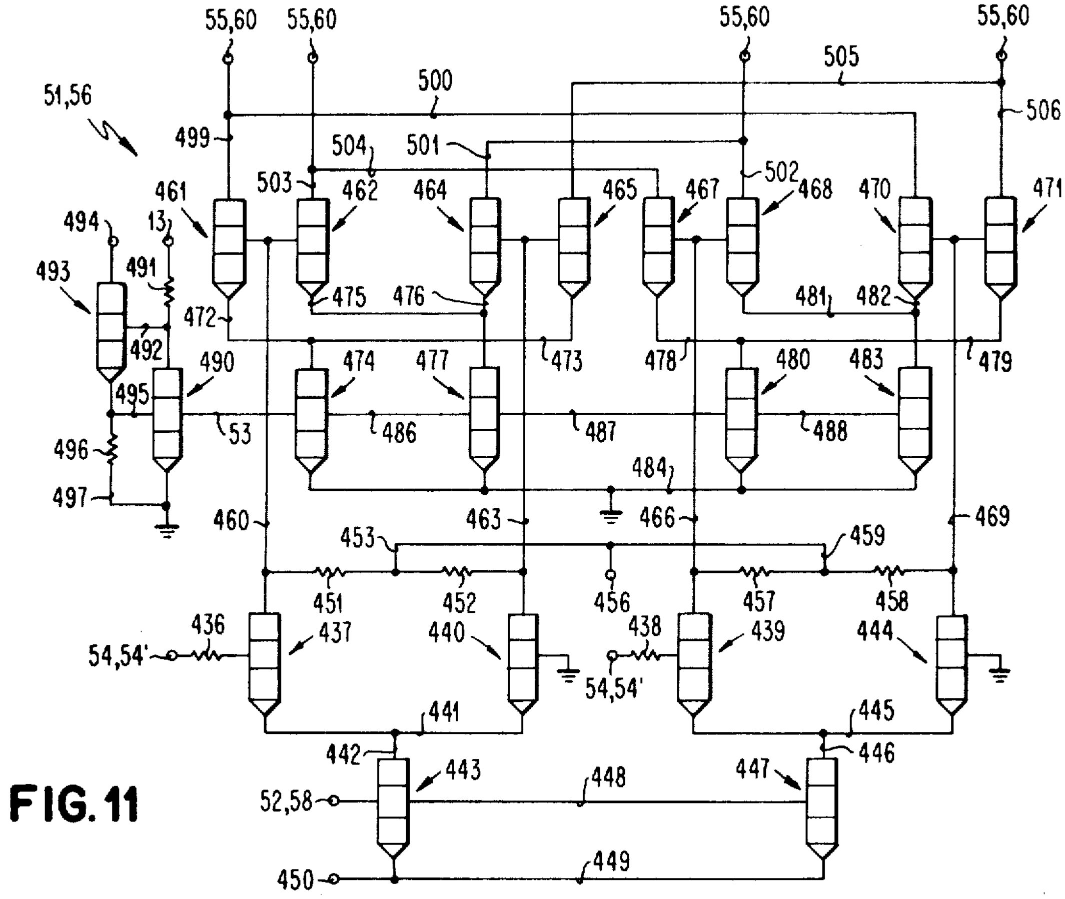
FIG. 11 is a circuit diagram of the bit decoder.

Referring to FIG. 11, there is disclosed the circuitry of first bit decoder 51 and second bit decoder 56. The left-hand address input line 54 or 54' is connected by a resistor 436 to the base of a transistor 437, and the right-hand address input line 54 or 54' is connected by a resistor 438 to the base of a transistor 439. A transistor 440 cooperates with transistor 437 to form a current switch and the emitters of these two transistors are connected by a lead 441 in turn connected by a lead 442 to the collector of a transistor 443. Similarly, another transistor 444 cooperates with transistor 439 to form a current switch and the emitters of these two transistors are connected by a lead 445 in turn connected by a lead 446 to the collector of a transistor 447. The bases of transistors 443, 447 are interconnected by a lead 448 and are also connected to the output line 52 or 58 of current reference source 34. The emitters of transistors 443, 447 are connected by a lead 449 in turn connected to a voltage supply 450.

The collectors of transistors 437, 440 are connected to load resistors 451, 452 connected by a lead 453 to a voltage supply 456, and the collectors of transistors 439, 444 are connected to load resistors 457, 458 in turn connected by a lead 459 to voltage supply 456. A lead 460 extends from the collector of transistor 437 to the bases of transistors 461, 462 and a lead 463 extends from the collector of transistor 440 to the bases of transistors 464, 465. A lead 466 extends from the collector of transistor 439 to the bases of transistors 467, 468 and a lead 469 extends from the collector of transistor 444 to the bases of transistors 470, 471.

The emitters of transistors 461, 465 are connected by leads 472, 473 to the collector of a transistor 474 and the emitters of transistors 462, 464 are connected by leads 475, 476 to the collector of a transistor 477. The emitters of transistors 467, 471 are connected by leads 478, 479 to the collector of a transistor 480 and the emitters of transistors 468, 470 are connected by leads 481, 482 to the collector of a transistor 483. The emitters of transistors 474, 477, 480, 483 are connected to a lead 484 which is connected to ground. The bases of transistors 474, 477, 480, 483 are interconnected by leads 486, 487, 488.

The bases of these transistors are connected by line 53 to the base of a transistor 490 having its collector connected to power gate line 13 by a resistor 491. The collector of transistor 490 is also connected by a lead 492 to the base of a transistor 493 having its collector connected to a voltage supply 494. The emitter of transistor 493 is connected by a lead 495 to the base of transistor 490, and said emitter is also connected by a resistor 496 to a lead 497 to ground. The emitter of transistor 490 is also connected to ground. Transistors 490, 493 and their associated circuitry constitute the current reference source 36 (FIG. 2). Only one such source 36 is provided for both bit decoders 51, 56 and line 57 extends to the base of transistor 474 of the other bit decoder 56.

The collectors of transistors 461, 470 are connected by leads 499, 500 to the first of the four output lines 55 or 60. The collectors of transistors 464, 468 are connected by leads 501, 502 to the second of the four output lines 55 or 60. The collectors of transistors 462, 467 are connected by leads 503, 504 to the third of the four output lines 55 or 60. The collectors of transistors 465, 471 are connected by leads 505, 506 to the fourth of the four output lines 55 or 60.

The operation of the circuitry of bit decoders 51, 56 shown in FIG. 11 will now be described. When power gate line 13 is activated to an up potential level, output lines 52, 58 from current reference source 34 are raised to an up potential level to activate current sink transistors 443, 447 thereby permitting current to flow through the current switch comprising transistors 437, 440 and the current switch comprising transistors 439, 444. If the signal into the left-hand address input line 54, 54' is at a potential higher than ground, then transistor 437 conducts while transistor 440 is cut off. If the signal is at a potential lower than ground level, then transistor 437 is cut off and transistor 440 is rendered conductive.

Similarly, the conductive state of transistors 439, 444 is determined by whether the signal at the right-hand address input line 54, 54' is at a potential higher or lower than ground level. Conduction by two of the four transistors 437, 439, 440, 444 will cause the potential of two of the four lines 460, 463, 466, 469 to be lowered, thereby cutting off two pairs of the four pairs of transistors 461, 462, 464, 465, 467, 468, 470, 471 and rendering the other two pairs of transistors conductive. This causes the potential of three of the four output lines 55, 60 to be pulled downwardly and allows the potential of one of these output lines 55, 60 to remain at an up potential level as the single selected output line.

Bit Matrix 61

Figure 12:
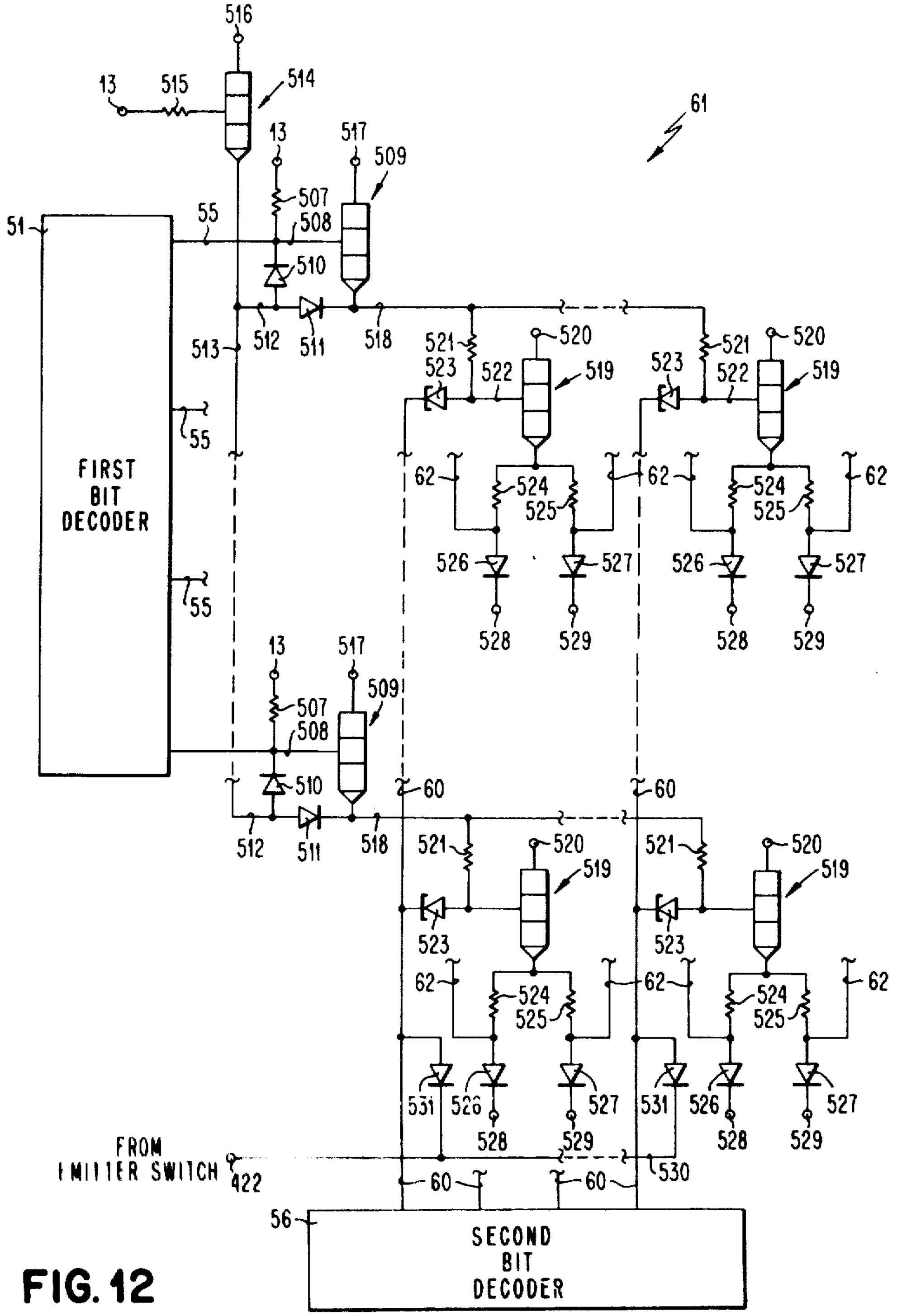
FIG. 12 is a circuit diagram of the bit matrix.

Referring now to FIG. 12, there is shown the circuitry of bit matrix 61. Each of the output lines 55 of first bit decoder 51 is connected to the lower end of a resistor 507 having its upper end connected to power gate line 13. The lower end of resistor 507 is connected by a lead 508 to the base of a transistor 509. Connected to the junction of resistor 507 and lead 508 is the cathode of a diode 510 having its anode connected to the anode of another diode 511 and to a lead 512 connected to a lead 513. The latter is connected to the emitter of a transistor 514 having its base connected through a resistor 515 to power gate line 13. The collector of transistor 514 is connected to a voltage supply 516 and the collector of transistor 509 is connected to a voltage supply 517. The emitter of each transistor 509 is connected to a horizontally extending line 518.

Bit matrix 61 is a four by four matrix of circuits each comprising the following structure. A transistor 519 has its collector connected to a voltage supply 520 and its base connected to the lower end of a resistor 521 through a lead 522. The upper ends of resistors 521 of each respective row of the matrix are connected to one of the lines 518. Each of the four output lines 60 from second bit decoder 56 extends vertically through the matrix of circuits. A diode 523 has its anode connected to the junction of resistor 521 and lead 522, and its cathode connected to the respective output line 60.

Connected to the emitter of each transistor 519 are the upper ends of a pair of resistors 524, 525 having their lower ends connected to the respective anodes of a pair of diodes 526, 527 having their cathodes connected to terminals 528, 529, respectively. One bit line 62 of each pair is connected to the junction of resistor 524 and diode 526, and the other bit line 62 is connected to the junction of resistor 525 and diode 527.

Extending from output line 422 of emitter switch 46 (FIG. 9) is a horizontally extending line 530 (FIG. 12). Each line 60 is connected to the anode of a diode 531 having its cathode connected to line 530.

The operation of the circuitry of bit matrix 61 shown in FIG. 12 will now be described. During selection of one of the elements of matrix 61, lines 422, 530 are at an up level because the potential at column select input 45' (FIG. 9) is at a down level. One of the output lines 55 from first bit decoder 51 is at an up level and one of the output lines 60 from second bit decoder 56 is also at an up level. The intersection of the activated line 55 and the activated line 60 selects one of the sixteen transistors 519; that is, the potential of the base of the selected transistor 519 is raised, thereby also raising the potential at the emitter of transistor 519 and turning on diodes 526, 527 so as to connect the lower ends of a pair of bit lines 62 to terminals 528, 529 and hence to the input lines 69 of data input/output circuit 63 (FIGS. 13, 15).

At the end of the read or write operation (to be described below) the potential at column select input 45' (FIG. 9) goes up, thereby raising the potential at the emitter of transistor 423 and the bases of transistors 420, 421 thereby turning on one of the latter to cause collector current to flow through load resistor 418 and thereby lower the potential of lines 422, 530 (FIG. 12). This turns on diodes 523, 531 pulling down the bases of the selected column of transistors 519. This accelerates the power down swing of the previously selected pair of bit lines 62.

Data Input/Output Circuit 63

Figure 13:
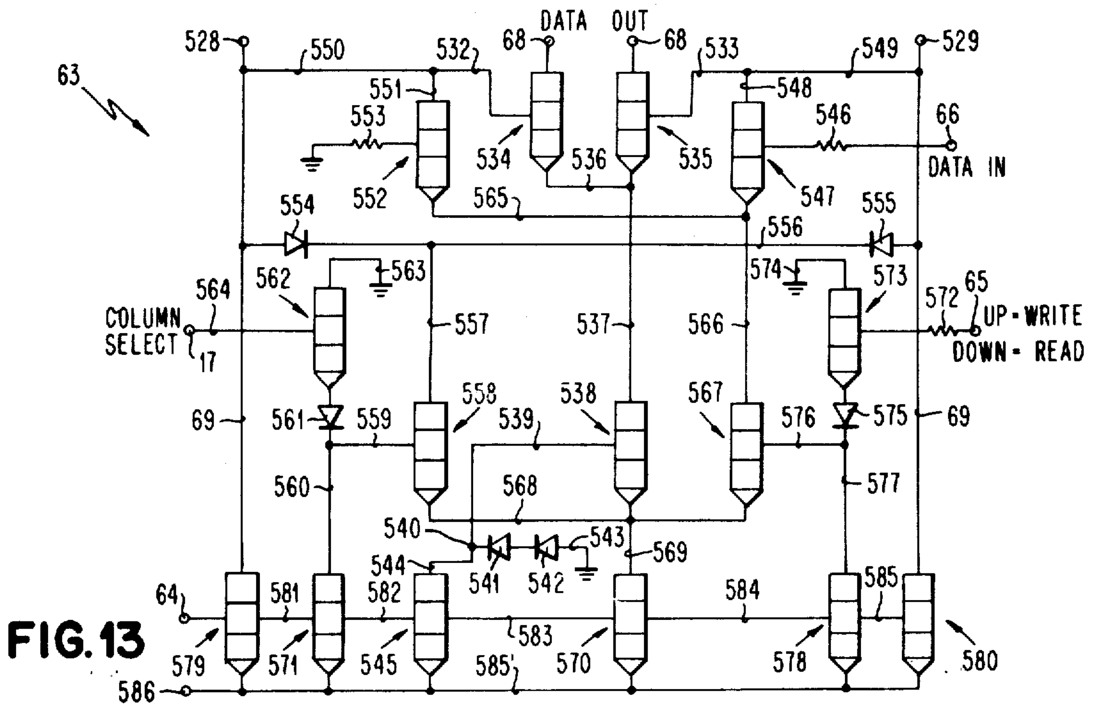
FIG. 13 is a circuit diagram of the data input/output circuit.

Referring now to FIG. 13, there is disclosed the circuitry of data input/output circuit 63. Each of the 16 nodes 528 of bit matrix 61 (FIG. 12) is connected to one line 69 of data input/output circuit 63, and each of the 16 nodes 529 is similarly connected to the other line 69. A pair of leads 532, 533 connect lines 69 to the respective bases of transistors 534, 535 having their emitters connected by a lead 536. Connected to the latter is a lead 537 in turn connected to the collector of a transistor 538 having its base connected by a lead 539 to a node 540. A pair of diodes 541, 542 extend in series, the cathode of diode 541 being connected to node 540 and the anode of diode 542 being connected to ground by a lead 543. A lead 544 extends from node 540 to the collector of a transistor 545.

The data in line 66 is connected through resistor 546 to the base of a transistor 547 having its collector connected through leads 548, 549 to the right-hand line 69. The left-hand line 69 is connected by leads 550, 551 to the collector of a transistor 552 having its base connected to ground through a resistor 553.

A diode 554 has its anode connected to the junction of leads 550, 551, and a diode 555 has its anode connected to the junction of leads 548, 549. The cathodes of diodes 554, 555 are connected together by a lead 556 connected by a lead 557 to the collector of a transistor 558 having its base connected by a lead 559 to a lead 560. The upper end of the latter is connected to the cathode of a diode 561 having its anode connected to the emitter of a transistor 562 having its collector connected to ground by a lead 563. The base of transistor 562 is connected by a lead 564 to the column select input 17.

The emitters of transistors 547, 552 are connected by a lead 565 in turn connected by a lead 566 to the collector of a transistor 567. The emitters of transistors 538, 558, 567 are connected by a lead 568 in turn connected by a lead 569 to the collector of a transistor 570. The lower end of lead 560 is connected to the collector of a transistor 571.

The write/read input 65 (FIG. 2) is connected by a resistor 572 to the base of a transistor 573 having its collector connected to ground by a lead 574. The emitter of transistor 573 is connected to the anode of a diode 575 having its cathode connected to the junction of leads 576, 577. Lead 576 is connected to the base of transistor 567 and lead 577 is connected to the collector of a transistor 578.

The lower end of the left-hand line 69 is connected to the collector of a transistor 579 and the lower end of the right-hand line 69 is connected to the collector of a transistor 580. The bases of transistors 545, 570, 571, 578, 579, 580 are interconnected by leads 581, 582, 583, 584, 585 and are connected to the input line 64 of current reference source 38 (FIG. 2). The emitters of transistors 545, 570, 571, 578, 579, 580 are connected to a lead 585' in turn connected to a voltage supply 586.

The operation of data input/output circuit 63 shown in FIG. 13 will now be described. For a read or write operation, the potential at column select input 17 must be at a down level. This lowers the potential at the base of transistor 558, permitting the current flowing through transistor 570 to flow through either transistor 438 or transistor 567 depending upon the potential at the write/read input 65. If the potential at the latter is up, then the potential at the base of transistor 567 is up, thereby permitting the current to flow through transistor 567 rather than transistor 538. If the potential at write/read input 65 is down, then the potential at the base of transistor 567 is lowered cutting off the latter transistor and permitting the current to flow instead through transistor 538. An up potential at write/read input 65 provides for a write operation, and a down potential provides for the read operation.

Considering first the read operation, transistor 538 is conductive so as to activate transistors 534, 535. The respective potentials on lines 69 are transmitted by leads 532, 533 to the bases of transistors 534, 535 which act as a differential amplifier to provide output signals on the data out lines 68.

For a write operation, the potential at write/read input 65 is at an up level so that current flows through transistor 567 to activate transistors 547, 552. The signal on data in line 66 will then turn on transistor 547 if the signal is at an up level or will turn on transistor 552 if the signal is at a down level. The potentials at the collectors of transistors 547, 552 is then transmitted through leads 550, 551 and 548, 549 to the respective lines 69 and to the terminals 528, 529 and then to the bit lines 62 so as to write the information into the selected memory cell in the manner described below with respect to FIGS. 14 and 15.

Memory Cell 587

Referring now to FIGS. 14 and 15, the former shows a single memory cell 587 and its interconnections, and the latter shows an array 40 of cells 587. Each memory cell 587 comprises a pair of transistors 588, 589. The collector of transistor 588 is connected by a lead 591 to the base of transistor 589 and the collector of transistor 589 is connected by a lead 590 to the base of transistor 588. A diode 592 extends from the left-hand bit line 62 to the collector of transistor 588, and a diode 593 extends from the right-hand bit line 62 to the collector of transistor 589.

A load resistor 594 has its lower end connected to the collector of transistor 588 and its upper end connected to the cathode of a diode 595, and a load resistor 596 has its lower end connected to the collector of transistor 589 and its upper end connected to the cathode of a diode 597. The anodes of diodes 595, 597 are connected by a lead 598 in turn connected by a lead 599 to the lower end of a resistor 600 having its upper end connected to a voltage supply 601.

One of each pair of output lines 50 from word matrix 49 is connected to a word top line 50' and the other output line 50 of each pair is connected to a word bottom line 50''. The junctions 599' of resistor 600 and leads 599 of each row of memory cells 587 are connected to the respective word top line 50', and the emitters of each pair of transistors 588, 589 of the row of memory cells 587 is connected to a respective word bottom line 50''. Each word bottom line 50'' is connected to the anode of a diode 602. All of the 32 diodes 602 of each column of memory cells 587 are connected to a current sink 603 as shown by leads 604. Current sink 603 is connected to ground.

The operation of the memory cells 587 of array 40 shown in FIGS. 14 and 15 will now be described. For both the read and write operations, the respective potentials of the word top line 50' and word bottom line 50'' are lowered for the row of memory cells 587 containing the cell to be selected. (However, for the read operation, it is not necessary that the word top line 50' be lowered).

For a read operation, the potentials of a pair of bit lines 62 are raised to select one memory cell 587 of the row. Assume, for example, that the right-hand transistor 589 of the selected cell is conductive and that the left-hand transistor 588 is cut off. Current will flow first in diode 593 and then in diode 592. The selected memory cell 587 is then in a powered-up state. The off-set voltage across the collectors of transistors 588, 589 then appears across the selected bit lines 62 and is transmitted through diodes 526, 527 to the lines 69 of data input/output circuit 63.

Describing now the write operation, the lowering of the potential of word top line 50' turns off collector diodes 595, 597 and thereby cuts off the base current flowing into the conductive transistor. Assume that transistor 589 is conductive and it is desired to switch states during the write operation. The potential of only the right-hand bit line 62 is allowed to rise. Current then flows through diode 593. When the current in the latter exceeds the collector current of transistor 589, transistor 588 will turn on. That is, when diode 593 conducts, the potential at the base of transistor 588 is raised so as to turn on transistor 588. The potential at the collector of transistor 588 then lowers so as to lower the potential at the base of transistor 589, thereby tending to cut-off the transistor 589 so as to raise the potential at its collector and thereby raise the potential at the base of transistor 588. This action is regenerative and the selected memory cell 587 quickly switches its state so that the formerly conductive transistor 589 becomes cut-off and the formerly cut-off transistor 588 becomes conductive.

Time Delay Circuitry

Figure 16:
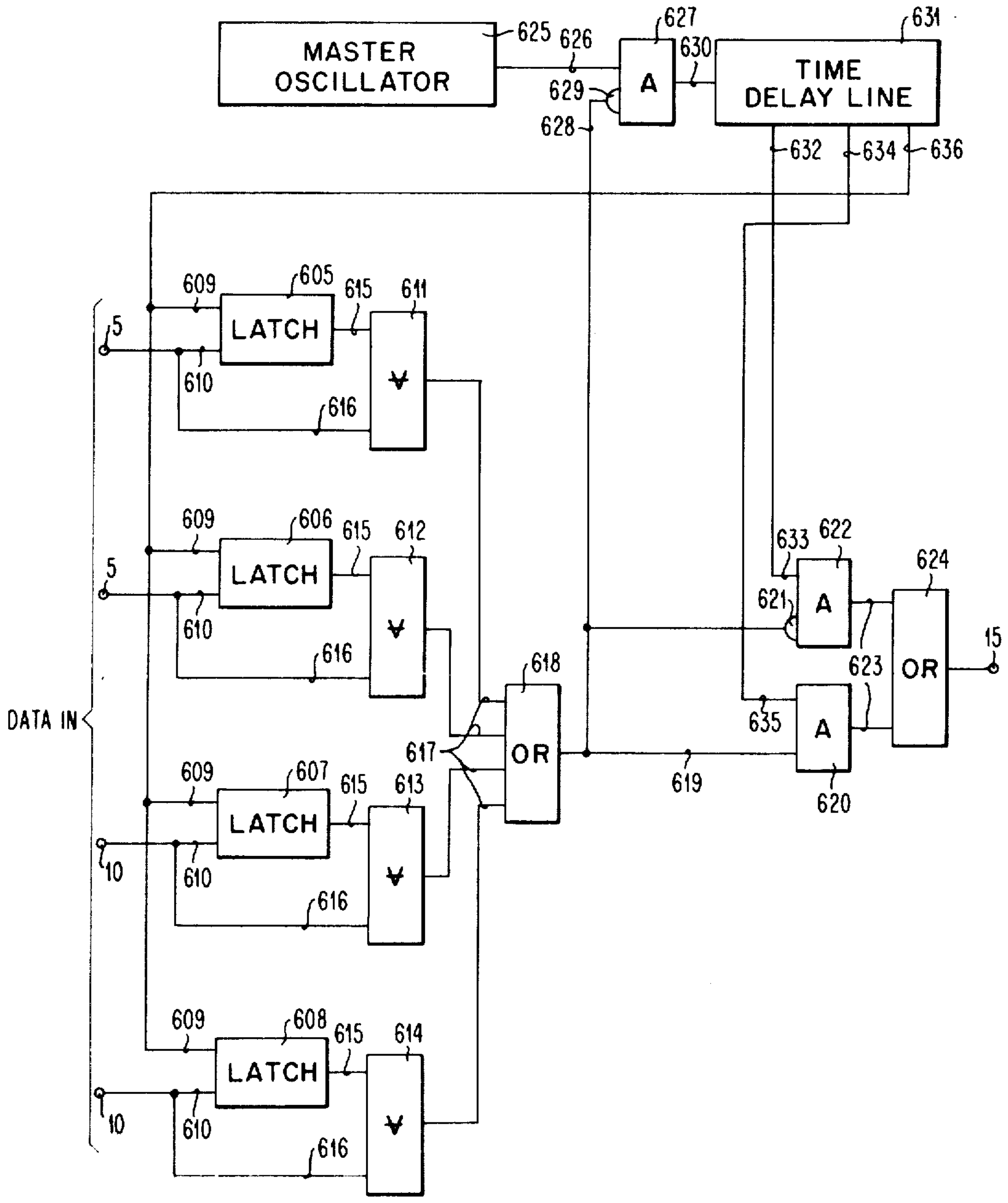
FIG. 16 is a logic block diagram of the circuitry for delaying the operating cycle whenever the currently selected power gate line to be powered up is different from the previously selected power gate line.

Referring now to FIG. 16, there is shown a logic block diagram of the circuitry for delaying the operating cycle whenever the currently selected power gate line 13 must be powered-up because it is different from the previously selected power gate line 13. There are provided four latch circuits 605, 606, 607, 608 each having a set input 609 and a data input 610. Two of the data inputs 610 are connected respectively to the two address input lines 5 going into power gate emitter decoder 4 (FIG 1). The other two data inputs 610 are connected respectively to the two address input lines 10 of power gate base decoder 9 (FIG. 1).

There are also provided for EXCLUSIVE-OR gates 611, 612, 613, 614 each having one input 615 connected to the output of a respective one of latch circuits 605, 606, 607, 608 and a second input 616 connected to the data input 610 of the respective latch circuit. Each of said EXCLUSIVE-OR gates 611, 612, 613, 614 is provided with an output connected to a respective one of the four inputs 617 of an OR gate 618. The output of the latter is connected to one input 619 of an AND gate 620 and also to the inhibit or invert input 621 of a second AND gate 622. The outputs of AND gates 620, 622 are connected to the inputs 623 of an OR gate 624. The output of the latter goes to the clock pulse input 15 of column select drivers 14 (FIG. 1).

The master oscillator of the computer is indicated at 625 and is provided with an output extending to an input 626 of an AND gate 627. A lead 628 extends from the output of OR gate 618 to the inhibit or invert input 629 of AND gate 627. The output of the latter extends to the input 630 of a time delay line 631. The latter has a first output tap 632 connected to an input 633 of AND gate 622, a second output tap 634 extending to the input 635 of AND gate 620, and a third output tap 636 extending to the four respective set inputs 609 of the four latch circuits 605, 606, 607, 608.

The operation of the circuitry for delaying the operating cycle as shown in FIG. 16 will now be described. First, let it be assumed that the memory cell to be currently addressed is within the same row of chips 3 as the memory cell previously addressed during the preceding cycle of operation. A pulse is generated by oscillator 625 at the beginning of the cycle. The current address signals are then transmitted to address input lines 5, 10 and are the same as the address signals for the preceding cycle of operation. When the pulse generated by oscillator 625 during the preceding cycle of operation reached output tap 636 of time delay line 631, the pulse was fed to set inputs 609 of latch circuits 605, 606, 607, 608 so as to store the old address signals of the preceding cycle in the latch circuits so that during the present cycle the old address signals appear at inputs 615 of EXCLUSIVE-OR gates 611, 612, 613, 614. The new address signals of the current cycle of operation are transmitted from address input lines 5, 10 to inputs 16 of EXCLUSIVE-OR gates 611, 612, 613, 614. At each EXCLUSIVE-OR gate the old address signal at input 615 will be the same as the current address signal at input 616 and hence none of EXCLUSIVE-OR gates 611, 612, 613, 614 is activated and hence none of the inputs 617 of OR gate 618 is activated so that the output of the latter is at a deactivated logic level. This signal is transmitted to the invert or inhibit input 621 of AND gate 622 so as to open the latter and thereby permit the pulse generated by oscillator 625 during the current cycle of operation to be transmitted from output tap 632 of delay line 631 through AND gate 622 and OR gate 624 to clock pulse input line 15. This enables actuation of a selected one of the four column select drivers 14 so as to lower the potential of one of the four column select lines 17 and thereby commence the chip accessing phase of the cycle of operation. Therefore, the cycle of operation of the memory system is not delayed when the memory cell being currently addressed is in the same row of chips 3 as the previously addressed cell.

Now let it be assumed that the memory cell being currently addressed is within a different row of chips 3 than the memory cell previously addressed. In this event, at least one of the current address signals appearing at address input lines 5, 10 and inputs 616 of EXCLUSIVE-OR gates 611, 612, 613, 614 will be different from the old address signal stored in the corresponding one of latch circuits 605, 606, 607, 608 and appearing at the corresponding one of inputs 615 of the EXCLUSIVE-OR gates. A mismatch of the signals will therefore be present at the pair of inputs 615, 616 of at least one of the EXCLUSIVE-OR gates so as to cause at least one of the inputs 617 of OR gate 618 to be at an activated logic level. The output of OR gate 618 is then at an activated logic level to close AND gates 622, 627. The pulse generated by oscillator 625 and appearing at output tap 632 of time delay line 631 is then blocked by the closed AND gate 622 and does not appear at clock pulse input line 15. Instead, the pulse reaches output tap 634 after a predetermined time delay period and is transmitted to the input 635 of AND gate 620. The latter is open due to the activated logic level at its input 619 and the pulse is transmitted through AND gate 620 and OR gate 624 to clock pulse input 15. This initiates actuation of one of the four column select drivers 14 so as to commence the chip accessing phase of the cycle of operation. It will thus be seen that when the memory cell being currently addressed is not within the same row of chips 3 as the previously addressed cell, the accessing portion of the cycle of operation is commenced after an additional time delay determined by the time required for the pulse to travel along time delay line 631 from first output tap 632 to second output tap 634. This additional time delay provides for the time required for the new power gate line 13 and its associated on-chip support circuits to be powered up.

The activated logic level of the output of OR gate 618 is transmitted to the inhibit input 629 of AND gate 627 to close the latter and thereby block the pulse generated by oscillator 625 during the next succeeding cycle of operation. Therefore, no pulse is transmitted to time delay line 631 and to clock pulse input 15 during the next cycle of oscillator 625. This provides sufficient time for the accessing and reading or writing phases of the present cycle of operation to be completed during the next cycle of oscillator 625 notwithstanding the time delay in initiating the accessing phase. AND gate 627 is again enabled when the oscillator pulse of the present cycle reaches output tap 636 of time delay 631 and sets the current address into latches 605, 606, 607 and 608.

Scope of the Invention

It is to be understood that the specific memory system disclosed in the drawings and described in detail above is merely illustrative of one of the many forms which the invention may take in practice, and that numerous modifications of the disclosed embodiment and other different embodiments will readily occur to those skilled in the art without departing from the invention as delineated in the appended claims which are to be construed as broadly as permitted by the prior art.

I claim:

1. A memory system comprising a plurality of memory cells arranged in groups, means for successively addressing various cells of said plurality, said means including a plurality of support circuit means arranged in groups each associated with a respective group of cells, means for supplying power to only a selected group of support circuit means associated with the group of cells containing the cell to be addressed, means for uninterruptedly maintaining the supply of power to said selected group of support circuit means for so long as the successive cells being addressed are within said group of cells associated with said selected group of support circuit means, means for interrupting the supply of power to said selected group of support circuit means when the cell to be currently addressed is not within said group of cells associated with said selected group of support circuit means, means for supplying power to a newly selected group of support circuit means associated with the different group of cells containing said last-recited cell to be currently addressed, means for periodically timing the operation of said addressing means, and means for delaying the operation of said addressing means when the cell to be currently addressed is not within said group of cells associated with said selected group of support circuit means.

2. A memory system as set forth in claim 1 wherein each of said support circuit means comprises decoder means for selecting the cell to be addressed.

3. A memory system as set forth in claim 1 wherein each of said support circuit means comprises data input/output circuit means for writing into and reading out of the addressed cell.

4. A memory system as set forth in claim 1 wherein said addressing means includes a word matrix and a bit matrix, and said support circuit means includes decoder means for said two matrices.

5. A memory system as set forth in claim 4 wherein said support circuit means includes data input/output circuit means for writing into and reading out of the addressed cell.

6. A monolithic memory system comprising an array of monolithic chips arranged in groups, each of said chips including an array of memory cells and support circuits associated therewith, means for successively addressing selected cells, means for supplying power to only the support circuits of a selected group of chips including the memory cell array having the selected cell to be addressed, and means for uninterruptedly maintaining the supply of power to the support circuits of said selected group of chips for so long as the successive cells being addressed are within said selected group of chips, means for interrupting the supply of power to the support circuits of said selected group of chips when the cell to be currently addressed is not within said selected group of chips, and means for supplying power to the support circuits of a newly selected group of chips containing said cell to be currently addressed, and means for periodically timing the operation of said addressing means.

7. A memory system as set forth in claim 6 and comprising means for delaying the operation of said addressing means when the cell to be currently addressed is not within a cell array on one of said original selected group of chips.

8. A memory system as set forth in claim 7 wherein said support circuits comprise decoder means for selecting the cell to be addressed.

9. A memory system as set forth in claim 8 wherein said support circuits comprise data input/output circuit means for writing into and reading out of the addressed cell.

10. A memory system as set forth in claim 6 wherein said addressing means includes on each chip a word matrix and a bit matrix each having an array of operative elements, and said support circuits include decoder means for selecting an operative element of each of said two matrices.

11. A memory system as set forth in claim 4 wherein said support circuits on each chip include a data input/output circuit for writing into and reading out of the addressed cell.

12. A memory system as set forth in claim 13 and comprising means for deactuating said power gate driver to interrupt the supply of power to said support circuits of said selected row of chips when the cell to be currently addressed is not within a cell array on one of said selected row of chips, and
means for actuating a different power gate driver to supply power to a newly selected row of chips having the cell array including said last-recited cell to be currently addressed.

13. A monolithic memory system comprising
an array of monolithic chips arranged in a plurality of rows,
each of said chips including an array of memory cells and support circuits associated therewith,
a plurality of power gate drivers each having a power gate line,
means connecting each of said power gate lines to the support circuits of a respective row of said chips,
means for successively addressing selected cells,
means for actuating a power gate driver to supply power to the support circuits of a selected row of chips which includes the selected memory cell to be addressed,
means for uninterruptedly maintaining the supply of power to said support circuits of said selected row of chips for so long as the successive cells being addressed are within said selected row of chips,
means for periodically timing the operation of said addressing means, and
means for delaying the operation of said addressing means when the cell to be currently addressed is not within said original selected row of chips.

14. A memory system as set forth in claim 13 wherein said support circuits on each chip comprise
decoder means for selecting the cell to be addressed.

15. A memory system as set forth in claim 13 wherein said support circuits on each chip comprise
data input/output circuit means for writing into and reading out of the addressed cell.

16. A memory system as set forth in claim 13 wherein
said addressing means includes a word matrix and a bit matrix, and
said support circuits include decoder means for said two matrices.

17. A memory system as set forth in claim 16 wherein
said support circuits on each chip include a data input/output circuit for writing into and reading out of the addressed cell.

18. A memory system as set forth in claim 19 and comprising
means for interrupting the supply of power to the current reference source means of said selected row of chips when the cell to be currently addressed is not within a cell array on one of said selected row, and
means for actuating a different power gate driver to supply power to the current reference source means of a newly selected row of chips which has the cell array containing said last-recited cell to be currently addressed.

19. A monolithic memory system comprising
an array of monolithic chips arranged in a plurality of rows,
each of said chips including an array of memory cells and support circuits associated therewith,
each of said chips including current reference source means connected to said support circuits,
a plurality of power gate drivers each having a power gate line connected to the current reference source means of a respective row of said chips,
means for successively addressing selected cells,
means for actuating a power gate driver to supply power to the current reference source means of a selected row of chips which includes the selected memory cell to be addressed,
means for uninterruptedly maintaining the supply of power to said current reference source means of said selected row of chips for so long as the successive cells being addressed are within said selected row of chips,
means for periodically timing the operation of said addressing means, and
means for delaying the operation of said addressing means when the cell to be currently addressed is not within a cell array on said selected row of chips.

20. A memory system as set forth in claim 19 wherein said support circuits comprise
decoder means for selecting the cell to be addressed.

21. A memory system as set forth in claim 20 wherein said support circuits comprise
data input/output circuit means for writing into and reading out of the addressed cell.

22. A memory system as set forth in claim 19 wherein
said addressing means includes a word matrix and a bit matrix, and
said support circuits include decoder means for said two matrices.

23. A memory system as set forth in claim 19 wherein
said support circuits include a data input/output circuit for writing into and reading out of the addressed cell.

* * * * *